US007370004B1

(12) United States Patent  
Patel et al.

(10) Patent No.: US 7,370,004 B1  
(45) Date of Patent: May 6, 2008

(54) PERSONALIZED INTERACTIVE NETWORK ARCHITECTURE

(75) Inventors: Ameet Patel, New York, NY (US); Jennifer Holme, New York, NY (US); Anthony Caiazzo, New York, NY (US)

(73) Assignee: The Chase Manhattan Bank, New York, NY (US)

( * ) Notice: Subject to any disclaimer, the term of this patent is extended or adjusted under 35 U.S.C. 154(b) by 0 days.

(21) Appl. No.: 09/564,783

(22) Filed: May 4, 2000

Related U.S. Application Data

(60) Provisional application No. 60/165,739, filed on Nov. 15, 1999.

(51) Int. Cl.  
*G06Q 40/00* (2006.01)

(52) U.S. Cl. .............................. 705/14; 705/26; 705/27

(58) Field of Classification Search ................. 705/14, 705/26, 27  
See application file for complete search history.

(56) References Cited

U.S. PATENT DOCUMENTS

| | | | |
|---|---|---|---|
| 3,634,669 | A | 1/1972 | Wyckoff et al. |
| 3,946,206 | A | 3/1976 | Darjany |
| 4,047,033 | A | 9/1977 | Maimberg |
| 4,545,838 | A | 10/1985 | Minkus |
| 4,582,985 | A | 4/1986 | Lofberg |
| 4,634,845 | A | 1/1987 | Riley et al. |
| 4,700,055 | A | 10/1987 | Kashkashian, Jr. |
| 4,750,119 | A | 6/1988 | Robertson et al. |
| 4,752,676 | A | 6/1988 | Leonard et al. |
| 4,766,293 | A | 8/1988 | Boston |
| 4,766,539 | A | 8/1988 | Fox |
| 4,789,928 | A | 12/1988 | Fujisaki |
| 4,822,985 | A | 4/1989 | Boggan et al. |
| 4,831,242 | A | 5/1989 | Englehardt |
| 4,870,259 | A | 9/1989 | Boggan et al. |

(Continued)

FOREIGN PATENT DOCUMENTS

CA      2293321       12/1998

(Continued)

OTHER PUBLICATIONS

Hoovers,General Mills, Inc. Corporate Profile relied upon to show the history of the company.*

(Continued)

*Primary Examiner*—Jagdish N Patel  
(74) *Attorney, Agent, or Firm*—Goodwin Procter LLP

(57) ABSTRACT

A system for personalizing interaction between a user communicating over at least one communication channel and a provider of information/products/services, the user having a communication device for communication over the channel with the provider, the system comprising a channel interface for interfacing with the channel, an information/product/service interface for interfacing with an information/product/service provider; and a knowledge management system coupled to the channel and information/product/service interface, the knowledge management system comprising a knowledge management repository storing information concerning the user, the information obtained from interaction with the user over the channel including current interactions between the user and the knowledge management system, and further storing information concerning a plurality of information/products/services to offer to the user, and a personalization engine for making a decision as to which of the plurality of information/product/services to present to the user over the communication channel based on the stored information in the knowledge management repository.

31 Claims, 28 Drawing Sheets

U.S. PATENT DOCUMENTS

| | | |
|---|---|---|
| 4,882,675 A | 11/1989 | Nichtberger |
| 4,897,533 A | 1/1990 | Lyszczarz |
| 4,906,826 A | 3/1990 | Spencer |
| 4,908,521 A | 3/1990 | Boggan et al. |
| 4,943,707 A | 7/1990 | Boggan |
| 4,953,085 A | 8/1990 | Atkins |
| 4,961,142 A | 10/1990 | Elliot et al. |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,080,748 A | 1/1992 | Bonomi |
| 5,095,194 A | 3/1992 | Barbanell |
| 5,117,355 A | 5/1992 | McCarthy |
| 5,175,416 A | 12/1992 | Mansvelt |
| 5,180,901 A | 1/1993 | Hiramatsu |
| 5,192,947 A | 3/1993 | Neustein |
| 5,202,826 A | 4/1993 | McCarthy |
| 5,206,803 A | 4/1993 | Vitagliano |
| 5,218,631 A | 6/1993 | Katz |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Parazza |
| 5,326,960 A | 7/1994 | Tannenbaum |
| 5,339,239 A | 8/1994 | Manabe et al. |
| 5,349,633 A | 9/1994 | Katz |
| 5,350,906 A | 9/1994 | Brody |
| 5,365,575 A | 11/1994 | Katz |
| 5,383,113 A | 1/1995 | Kight et al. |
| 5,397,881 A | 3/1995 | Mannik |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,459,306 A | 10/1995 | Stein et al. |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine et al. |
| 5,479,494 A | 12/1995 | Clitherow |
| 5,482,139 A | 1/1996 | Rivalto |
| 5,483,444 A | 1/1996 | Malark |
| 5,483,445 A | 1/1996 | Pickering |
| 5,500,514 A | 3/1996 | Veeneman |
| 5,511,114 A | 4/1996 | Stimson |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | McKoy |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone et al. |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle |
| 5,664,110 A | 9/1997 | Green |
| 5,665,953 A | 9/1997 | Mazzamuto |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A * | 11/1997 | Deaton et al. ................ 705/14 |
| 5,689,100 A | 11/1997 | Carrithers |
| 5,689,650 A | 11/1997 | McClelland et al. |
| 5,692,132 A | 11/1997 | Hogan |
| 5,699,528 A | 12/1997 | Hogan |
| 5,704,046 A | 12/1997 | Hogan |
| 5,705,798 A | 1/1998 | Tarbox |
| 5,708,422 A | 1/1998 | Blonder |
| 5,710,886 A | 1/1998 | Christensen |
| 5,710,887 A | 1/1998 | Chelliah et al. |
| 5,715,399 A | 2/1998 | Bezos |
| 5,721,768 A | 2/1998 | Stimson |
| 5,721,781 A | 2/1998 | Deo et al. |
| 5,727,153 A | 3/1998 | Powell |
| 5,729,693 A | 3/1998 | Holda-Fleck |
| 5,734,838 A | 3/1998 | Robinson |
| 5,737,421 A | 4/1998 | Audebert |
| 5,740,549 A * | 4/1998 | Reilly et al. ................ 705/14 |
| 5,742,775 A | 4/1998 | King |
| 5,745,049 A | 4/1998 | Akiyama et al. |
| 5,745,706 A | 4/1998 | Wolfberg et al. |
| 5,749,075 A | 5/1998 | Toader et al. |
| 5,760,381 A | 6/1998 | Stich |
| 5,765,141 A | 6/1998 | Spector |
| 5,770,843 A | 6/1998 | Rose |
| 5,774,870 A | 6/1998 | Storey |
| 5,777,305 A | 7/1998 | Smith |
| 5,777,306 A | 7/1998 | Masuda |
| 5,778,067 A | 7/1998 | Jones et al. |
| 5,787,156 A | 7/1998 | Katz |
| 5,787,404 A | 7/1998 | Fernandez-Holman |
| 5,794,207 A | 8/1998 | Walker et al. |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,819,234 A | 10/1998 | Slavin et al. |
| 5,832,457 A | 11/1998 | O'Brien |
| 5,835,061 A * | 11/1998 | Stewart ...................... 342/457 |
| 5,835,576 A | 11/1998 | Katz |
| 5,839,113 A | 11/1998 | Federau et al. |
| 5,845,259 A | 12/1998 | West |
| 5,845,260 A | 12/1998 | Nakano et al. |
| 5,852,811 A | 12/1998 | Atkins |
| 5,852,812 A | 12/1998 | Reeder |
| 5,857,079 A | 1/1999 | Claus . |
| 5,857,175 A | 1/1999 | Day |
| 5,857,709 A | 1/1999 | Chock |
| 5,859,419 A | 1/1999 | Wynn |
| 5,864,609 A | 1/1999 | Cross |
| 5,864,828 A | 1/1999 | Atkins |
| 5,864,830 A | 1/1999 | Armetta |
| 5,870,718 A | 2/1999 | Spector |
| 5,870,721 A | 2/1999 | Norris |
| 5,875,437 A | 2/1999 | Atkins |
| 5,883,810 A | 3/1999 | Franklin |
| 5,884,278 A | 3/1999 | Powell |
| 5,884,285 A | 3/1999 | Atkins |
| 5,887,065 A | 3/1999 | Audebert |

| | | | | | |
|---|---|---|---|---|---|
| 5,890,138 A | 3/1999 | Godin et al. | 6,186,793 B1 | 2/2001 | Brubaker |
| 5,897,620 A | 4/1999 | Walker et al. | 6,189,787 B1 | 2/2001 | Dorf |
| 5,911,135 A | 6/1999 | Atkins | 6,195,644 B1 | 2/2001 | Bowie |
| 5,911,136 A | 6/1999 | Atkins | RE37,122 E | 4/2001 | Levine et al. |
| 5,920,629 A | 7/1999 | Rosen | 6,227,447 B1 | 5/2001 | Campisano |
| 5,920,847 A | 7/1999 | Kolling et al. | 6,243,688 B1 | 6/2001 | Kalina |
| 5,923,734 A | 7/1999 | Taskett | 6,263,316 B1 | 7/2001 | Khan et al. |
| 5,926,800 A | 7/1999 | Baronowski | 6,265,977 B1 | 7/2001 | Vega et al. |
| 5,930,217 A | 7/1999 | Kayanuma | 6,295,522 B1 | 9/2001 | Boesch |
| 5,933,817 A | 8/1999 | Hucal | 6,298,336 B1 | 10/2001 | Davis et al. |
| 5,937,068 A | 8/1999 | Audebert | 6,308,268 B1 | 10/2001 | Audebert |
| 5,940,811 A | 8/1999 | Norris | 6,330,550 B1 * | 12/2001 | Brisebois et al. ............. 705/75 |
| 5,953,423 A | 9/1999 | Rosen | 6,336,099 B1 | 1/2002 | Barnett et al. |
| 5,953,710 A | 9/1999 | Fleming | 6,341,724 B2 | 1/2002 | Campisano |
| 5,955,961 A | 9/1999 | Wallerstein | 6,345,261 B1 | 2/2002 | Feidelson |
| 5,963,648 A | 10/1999 | Rosen | 6,345,766 B1 | 2/2002 | Taskett et al. |
| 5,970,480 A | 10/1999 | Kalina | 6,373,969 B1 | 4/2002 | Adler |
| 5,974,399 A | 10/1999 | Giuliani et al. | 6,386,444 B1 | 5/2002 | Sullivan |
| RE36,365 E | 11/1999 | Levine et al. | 6,397,202 B1 | 5/2002 | Higgins et al. |
| 5,987,434 A | 11/1999 | Libman | 6,405,182 B1 | 6/2002 | Cuervo |
| 5,988,509 A | 11/1999 | Taskett | 6,422,459 B1 | 7/2002 | Kawan |
| 5,991,413 A | 11/1999 | Arditti et al. | 6,422,462 B1 | 7/2002 | Cohen |
| 5,991,748 A | 11/1999 | Taskett | 6,429,927 B1 | 8/2002 | Borza |
| 5,991,750 A | 11/1999 | Watson | 6,434,259 B1 | 8/2002 | Hamid et al. |
| 6,000,608 A | 12/1999 | Dorf | 6,446,210 B1 | 9/2002 | Borza |
| 6,000,832 A | 12/1999 | Franklin et al. | 6,463,039 B1 | 10/2002 | Ricci et al. |
| 6,006,988 A | 12/1999 | Behrmann et al. | 6,467,684 B2 | 10/2002 | Fite et al. |
| 6,009,415 A | 12/1999 | Shurling et al. | 6,473,500 B1 | 10/2002 | Risafi et al. |
| 6,014,636 A | 1/2000 | Reeder | 6,484,144 B2 | 11/2002 | Martin et al. |
| 6,014,638 A | 1/2000 | Burge et al. | 6,484,148 B1 | 11/2002 | Boyd |
| 6,014,645 A | 1/2000 | Cunningham | 6,498,861 B1 | 12/2002 | Hamid et al. |
| 6,014,749 A | 1/2000 | Gloor et al. | 6,505,168 B1 | 1/2003 | Rothman et al. |
| 6,016,954 A | 1/2000 | Abe | 6,560,578 B2 * | 5/2003 | Eldering ..................... 705/14 |
| 6,026,370 A | 2/2000 | Jermyn | 6,574,603 B1 | 6/2003 | Dickson et al. |
| 6,029,139 A | 2/2000 | Cunningham et al. | 6,581,839 B1 | 6/2003 | Lasch et al. |
| 6,029,890 A | 2/2000 | Austin | 6,601,761 B1 | 8/2003 | Katis |
| 6,032,136 A | 2/2000 | Brake, Jr. et al. | 6,609,111 B1 | 8/2003 | Bell |
| 6,036,099 A | 3/2000 | Leighton | RE38,255 E | 9/2003 | Levine et al. |
| 6,038,292 A | 3/2000 | Thomas | 6,615,189 B1 | 9/2003 | Phillips et al. |
| 6,038,552 A | 3/2000 | Fleischl | 6,615,190 B1 | 9/2003 | Slater |
| 6,041,315 A | 3/2000 | Pollin | 6,625,582 B2 | 9/2003 | Richman et al. |
| 6,047,067 A | 4/2000 | Rosen | 6,641,050 B2 | 11/2003 | Kelley et al. |
| 6,049,773 A | 4/2000 | McCormack et al. | 6,675,127 B2 | 1/2004 | LaBlanc et al. |
| 6,049,782 A | 4/2000 | Gottesman et al. | 6,745,938 B2 | 6/2004 | Sullivan |
| 6,065,675 A | 5/2000 | Teicher | 6,805,287 B2 | 10/2004 | Bishop |
| 6,070,147 A | 5/2000 | Harms et al. | 2001/0027441 A1 | 10/2001 | Wankmueller |
| 6,070,153 A | 5/2000 | Simpson | 2001/0034682 A1 | 10/2001 | Knight et al. |
| 6,076,068 A | 6/2000 | DeLapa et al. | 2001/0044293 A1 | 11/2001 | Morgan |
| 6,076,072 A | 6/2000 | Libman | 2001/0054003 A1 | 12/2001 | Chien et al. |
| 6,078,888 A | 6/2000 | Johnson, Jr. | 2002/0026418 A1 | 2/2002 | Koppel et al. |
| 6,078,891 A | 6/2000 | Riordan et al. | 2002/0046255 A1 | 4/2002 | Moore et al. |
| 6,091,817 A | 7/2000 | Bertina et al. | 2002/0062235 A1 | 5/2002 | Wahlbin et al. |
| 6,092,056 A | 7/2000 | Tull, Jr. et al. | 2002/0077978 A1 | 6/2002 | O'Leary et al. |
| 6,095,412 A | 8/2000 | Bertina et al. | 2002/0091572 A1 | 7/2002 | Anderson et al. |
| 6,098,053 A | 8/2000 | Slater | 2002/0091631 A1 | 7/2002 | Usui |
| 6,105,011 A | 8/2000 | Morrison, Jr. | 2002/0095365 A1 | 7/2002 | Slavin et al. |
| 6,105,865 A | 8/2000 | Hardesty | 2002/0104878 A1 | 8/2002 | Seifert et al. |
| 6,115,458 A | 9/2000 | Taskett | 2002/0143703 A1 | 10/2002 | Razvan |
| 6,119,932 A | 9/2000 | Maloney et al. | 2002/0147662 A1 | 10/2002 | Anderson |
| 6,128,598 A | 10/2000 | Walker et al. | 2002/0165820 A1 | 11/2002 | Anvekar et al. |
| 6,128,599 A | 10/2000 | Walker et al. | 2003/0004828 A1 | 1/2003 | Epstein |
| 6,129,274 A | 10/2000 | Suzuki | 2003/0023549 A1 | 1/2003 | Armes et al. |
| 6,134,536 A | 10/2000 | Shepherd | 2003/0046249 A1 | 3/2003 | Wu |
| 6,145,741 A | 11/2000 | Wisdom et al. | 2003/0053609 A1 | 3/2003 | Risafi et al. |
| 6,148,297 A | 11/2000 | Swor et al. | 2003/0101119 A1 | 5/2003 | Persons et al. |
| 6,161,096 A | 12/2000 | Bell | 2003/0105672 A1 | 6/2003 | Epstein et al. |
| 6,163,770 A | 12/2000 | Gamble et al. | 2003/0140004 A1 | 7/2003 | O'Leary et al. |
| 6,164,533 A | 12/2000 | Barton | 2003/0144935 A1 | 7/2003 | Sobek |
| 6,167,385 A | 12/2000 | Hartley-Urquhart | 2003/0163403 A1 | 8/2003 | Chen et al. |
| 6,169,975 B1 | 1/2001 | White et al. | 2003/0172040 A1 | 9/2003 | Kemper et al. |
| 6,173,267 B1 | 1/2001 | Cairns | 2003/0195808 A1 | 10/2003 | Brown et al. |
| 6,182,048 B1 | 1/2001 | Osborn et al. | 2003/0200180 A1 | 10/2003 | Phelan et al. |
| 6,182,894 B1 | 2/2001 | Hackett et al. | 2003/0216965 A1 | 11/2003 | Libman |

| | | | |
|---|---|---|---|
| 2004/0030626 | A1 | 2/2004 | Libman |
| 2004/0039588 | A1 | 2/2004 | Libman |
| 2005/0027649 | A1 | 2/2005 | Cech |

FOREIGN PATENT DOCUMENTS

| | | |
|---|---|---|
| EP | 959440 | 11/1999 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 99/05633 | 2/1999 |

OTHER PUBLICATIONS

Ron Edwards, ABA Banking Journal, pp. 58, 60 (Mar. 1999).
General Counsel's Opinion No. 8—Stored Value Cards, 61 Fed. Reg. 40490, Aug. 2, 1996, <http://wwwfdic.gov/regulations/laws/rules/5500-500.html>.
Song, A card that asks for ID, Time Mazgazine, Apr. 12, 2004, 1 page.
Credit Card News, "A store card issuer looks for lift from electronic gift certificates," Feb. 1, 1995, 2 pages.
Fickenscher, "Amex prepaid offering is latest card for firms regarding employees", American Banker, vol. 161, No. 151, Aug. 8, 1996, 2 pages.
Neumann, An Enhanced Neural Technique for Software Risk Analysis, IEEE Transactions on Software Engineering, vol. 28, No. 9, pp. 904-912, Sep. 1, 2002.
Associates First Capital Corporation, Hoover's Inc., The Industry Standard: The Newsmagazine of the Internet Economy, thestandard.net/companies/company-display, Apr. 6, 1999, 2 pages.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Brehl, Banks issue cash-card pledge, The Toronto Star, Oct. 9, 1997, 1 page.
Block, Blockbuster running test of stored value card, The American Banker, Sep. 1, 1995, 2 pages.
Meece, Boatmen's prepaid cards for worker-incentive firm, American Banker, Jul. 2, 1996, p. 12.
Boatmen's Floats Stored Value into the Employee Incentive Waters, Debit Card News, vol. 2, Issue. Jul. 16, 1996, 3 pages.
CardEx Incentives, The Future of Gifts & Incentives, Apr. 6, 1999, 15 pages.
CardFlash®, Apr. 5, 2005.
Rosen, Cash Just Isn't Flexible Enough: Shops of the Future Will Only Take Cards, Daily Express, Technology, Feb. 10, 1995, 1 page.
Morgan et al., Categorizing Risks for Risk Ranking, vol. 20, No. 1, pp. 49-58, Jun. 22, 2005.
CES/NaBANCO introduces stored value card technology, Blockbuster video is first merchant partner, Business Wire, Jan. 15, 1996, 2 pages.
Common electronic purse specifications, Business Requirements; Version 6.0, Dec. 1998.
Guidotti, Comparing Environmental Risks: A Consultative Approach to Setting Priorities at the Community Level, Public Health Rev, vol. 22, pp. 321-337, Jun. 16, 2005.
Britt, Competing in auto lending, America's Community Banker, vol. 5, No. 11, pp. 33-37, Nov. 1996.
Consortium created to manage common electronic purse specification, Cardtech Securtech, Chicago, www.visa.com/av/news/PRmisc051199.vhtml, May 11, 1999.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
D.C. area Safeway stores look for increase in sales volume and revenue with cards, Card News, vol. 6, No. 25, ISSN: 0894-0797, Dec. 30, 1991, 3 pages.
Piskora, Debit Cards Seen Poised for New Markets, American Banker, Credit/Debit/ATM's, Mar. 7, 1995, p. 16.

Electronic Purse, SCIA (Smart Card Industry Association), About Smart Cards, printed Feb. 23, 2001, www.scia.org, 1 page.
Sanchez-Klein, Electronic purse alliance planned, Computerworld Online News, Jul. 29, 1998, printed Feb. 23, 2001, 2 pages.
Electronic Purse Can Free You From ATM Drag, Business Times, www.btimes.co.za, printed Feb. 23, 2001, 1 page.
Electronic purse card to be launched tomorrow, New Straits Times, News Clippings, Sep. 18, 1999, printed Feb. 23, 2001, 3 pages.
E-Z Pass, Web page, http://www.ezpass.com/whatis.html, Nov. 12, 2001.
E-Z Pass, Web page, http://www.ezpass.com/frameMain.htm, Nov. 12, 2001.
E-Z Pass, Web page, http://www.ezpass.com/Disc_portNewYork.htm, Nov. 12, 2001.
E-Z Pass, Web page, http://www.ezpass.com/Disc_ny_annual.htm, Nov. 12, 2001.
First data markets stored-value cards, Cards International, Jan. 30, 1996, p. 5.
Norris, First data unit develops blockbuster cash card, Omaha World Herald, Jan. 19, 1996, Sunrise Edition, p. 16.
First Union Issues Smart Cards to Fort Benning Recruits, CardFax, vol. 1999, No. 60, Mar. 26, 1999, 1 page.
First USA—Activate Today and Get One Hour Free Calling Card Calls, Call 1-800-555-2535, First USA, undated, 6 pages.
First USA—Call 1(800)335-2453 to Receive One Free Hour of Domestic Long Distance Calling (No Strings Attached), First USA, undated, 6 pages.
First USA Platinum Connect, First USA Bank, First USA Promotional Mailing, Oct. 1997, 6 pages.
ECARD, Frequently asked questions, www.ergeard.com, printed Feb. 23, 2001, 7 pages.
Machlis, Have it the smart way: Burger King program drives smart-card use, Computerworld, printed Feb. 23, 2001, 1 page.
Here's the calling convenience you asked for: 1-800-call-AT&T . . . For All Calls, AT&T, Appendix A: For Card Carriers, 1999, 7 pages.
Konrad, IBM had a bunch of unusual ideas in 2003, www.philly.com, printed Jan. 21, 2004, posted on Jan. 13, 2004, 2 pages.
Coulton, Incentives field moving to card-based series 14, American Banker, Mar. 26, 1998, 3 pages.
Incentive firms find debit cards a rewarding experience (Off-line debit card issuers converge efforts with companies looking for effective incentives to boost employee productivity and to motivate individuals to buy their products), Debit Card News, vol. 3, No. 11, Nov. 28, 1997, 3 pages.
Introducing SpendingMoney(TM), Armetta: Marketing & Design Product Concept Report, Oct. 9, 1996, 15 pages.
Introducing the First USA Platinum Connect Card, First USA Promotional Mailing, Dec. 1997, 2 pages.
Key Bank Holiday Offer, http://www.key.com/swiftgift/home.html, printed Apr. 5, 1999.
MailFrontier Survey Finds that Consumers Hold Financial Institutions Accountable for Online Identity Theft, www.mailfrontier.com, Palo Alto, CA, Nov. 2004.
O'Connor, Maritz gets mastercard's stamp of approval, Business Travel News, Aug. 19, 1996, 2 pages.
More retailers Turn to Co-Branding, Chain Store Age Executive with Shopping Center Age, Feb. 1, 1995, 3 pages.
Bogle, Mutual Funds at the Millennium: Funds Directors and Fund Myths, The Vanguard Group, To the '40 Act Institute of PLI (Practicing Law Institute), New York, NY, May 15, 2000, 15 pages.
New 1-800-CALL-ATT campaign promotes one number for all calls, AT&T Marketing, News Release, Feb. 17, 1997, 2 pages.
Payment data, www.paymentdata.com, Nov. 8, 2004.
Dugas, Payroll May Ask: Paper or Plastic?, USA Today, 3B, Aug. 14, 2001, 1 page.
Proton world and Europay to co-operate in creation of new CEPS-compliant E-purse application, Press release '99, printed Feb. 23, 2001, Waterloo, Belgium, Jun. 28, 1999, 2 pages.
Brown et al., Purchasing Card Magic: Eli Lilly Finds Accounts Payable Flying High With Plastic, Corporate Cashflow, Nov. 1994, 4 pages.

Purse application for cross border use in euro, CORDIS, Pace 1st 1999-11531 Pace, printed Feb. 23, 2001, www.cordis.lu, 3 pages.

Miller et al. Section E.2.1: Kerberos Authentication and Authorization System Project Athena, Cambridge, Massachusetts, Dec. 21, 1987, 39 pages.

SK 100 Smart Card Electronic Purse Balance Reader, printed Feb. 23, 2001, 1 page.

Smart card for loyalty and e-purse applications eclipses capability of conventional mag-stripe cards, Press Release, www.1.slb.com, Apr. 21, 1997, printed Feb. 23, 2001, 3 pages.

Lzarony, "Stuck for a gift? Give a prepaid credit card", www.bankrate.com, Dec. 21, 1998, 1 page.

Souccar, Smart Cards: 1st Union Smart Card Pilot Enlists a Second Army Base, American Banker, 3 pages.

Spurgin, Sopininmon! or What's happening in the retail credit card environment, Credit World Journal, Apr. 1997, 7 pages.

Lacker, Stored Value Cards: Costly Private Substitutions for Government Currency, Economic Quarterly, 1996, 17 pages.

SmartAxis, Load cash on to your e-purse card, Supported Currencies and Schemes, www.smartaxis.co.uk, printed Feb. 23, 2001, 9 pages.

Key, Swift Gift 'Wows' Internet Shoppers, PR Newswire, www.key.com/swiftgift/home.html, Dec. 2, 1998, 1 page.

The Electronic Purse Reaches the Car Park, printed Feb. 23, 2001, 2 pages.

Stuber, The electronic purse: An overview or recent developments and issues, Bank of Canada, Technical Report No. 74, www.bankofcanada.ca, Jan. 1996, printed Feb. 23, 2001, 2 pages.

The Evolution of a New Consumerism, Chain Store Age, vol. 73, pp. 8-9, Jun. 1997, 3 pages.

Stoughton, The Gift of Credit, www.washingtonpost.com/wp-srv/business, Dec. 14, 1998.

ICL, Understanding the benefits, Smartcity offers a number of important benefits to both the card issuers and the customers, www.icl.com, printed Feb. 27, 2001, 2 pages.

Universal card free lifetime membership extended 3 months, AT&T Marketing, www.att.com/press/0297/970217.csa.html, Dec. 4, 1990, 2 pages.

Langheinrich et al., Unintrusive Customization Techniques for Web Advertising, Computer Networks, vol. 31, 1999, pp. 1259-1272.

Visa Cash, <www.visa-asia.com/pd/cash/main.html>, Feb. 23, 2001.

Visa Cash—Where can I get it?, <www.visa-asia.com/pd/cash/main.html>, Feb. 23, 2001.

Visa first to launch electronic purse load via GSM mobile phone, Johannesburg, Apr. 7, 1999, printed Feb. 23, 2001, www.cellular.co, 4 pages.

Visa International and SERMEPA Announce Plans for Cross Border Visa Cash Based on CEPS, <www.visa.com/av/news/praaamisc111699.vhtml>, Nov. 16, 1999, Pairs.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New Yorks Times, printed Feb. 23, 2001, 2 pages.

Welcome to Card Express, The CardEx Incentive Card, as disclosed in the CardEx web site archived by web.archive.org on Feb. 7, 1998; http://web.archive.org/web/*/http://www.cardex.com, retrieve Oct. 18, 2003, 8 pages.

Welcome to Card Express, CardEx web site archived by web.archive.org on Oct. 31, 1996 [http://web.archive.org/web/*/http://www.cacrdex.com], retrieve Oct. 18, 2003, 7 pages.

Welcome to Swiftgift, Swiftgift, www.swiftgftcard.com, Dec. 8, 1998, 10 pages.

Machlis et al., Will smart cards replace ATMs?, Computerworld, printed Feb. 23, 2001, 3 pages.

Langheinrich et al., Computer Networks, vol. 31, pp. 1259-1272 (1999).

Mobasher et al., "Creating Adaptive Web Sites Through Usage-Based Clustering of URLs", Knowledge and Data Engineering Exchange, Workshop on Chicago, IL, U.S.A., and Los Alamitos, CA, U.S.A., pp. 19-25 (1999).

Ron Edwards, ABA Banking Journal, pp. 58, 60 (Mar. 1999).

* cited by examiner

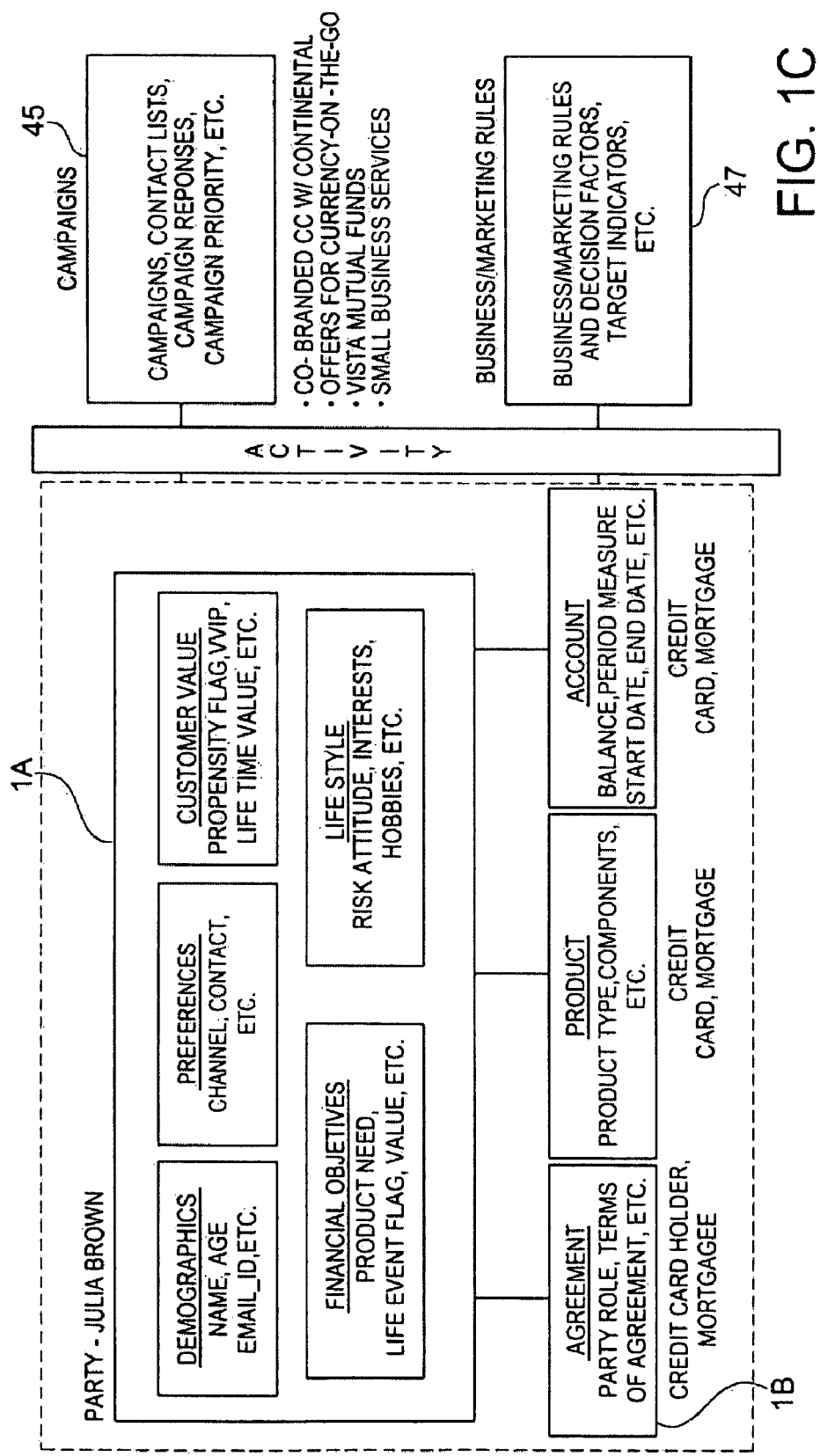

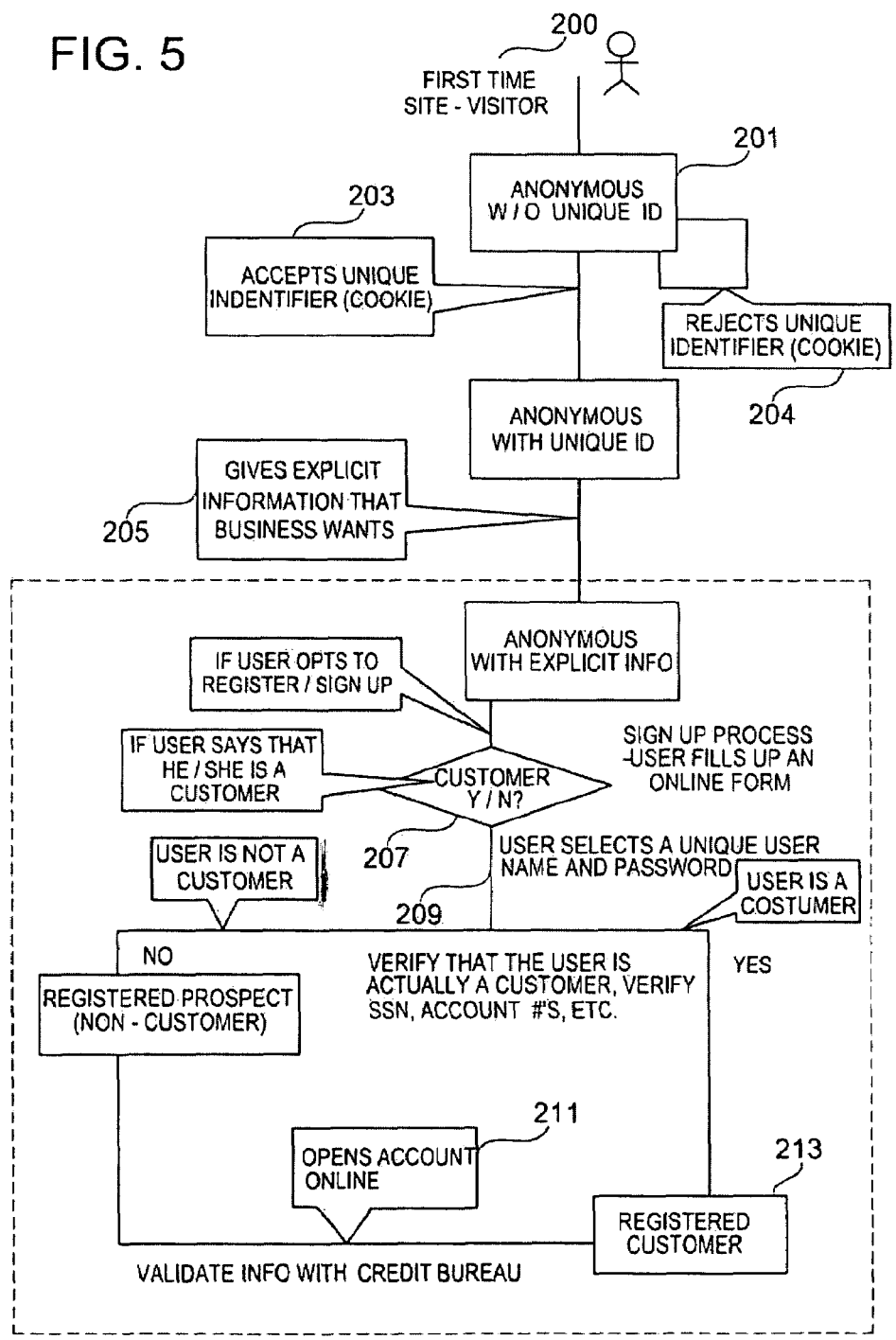

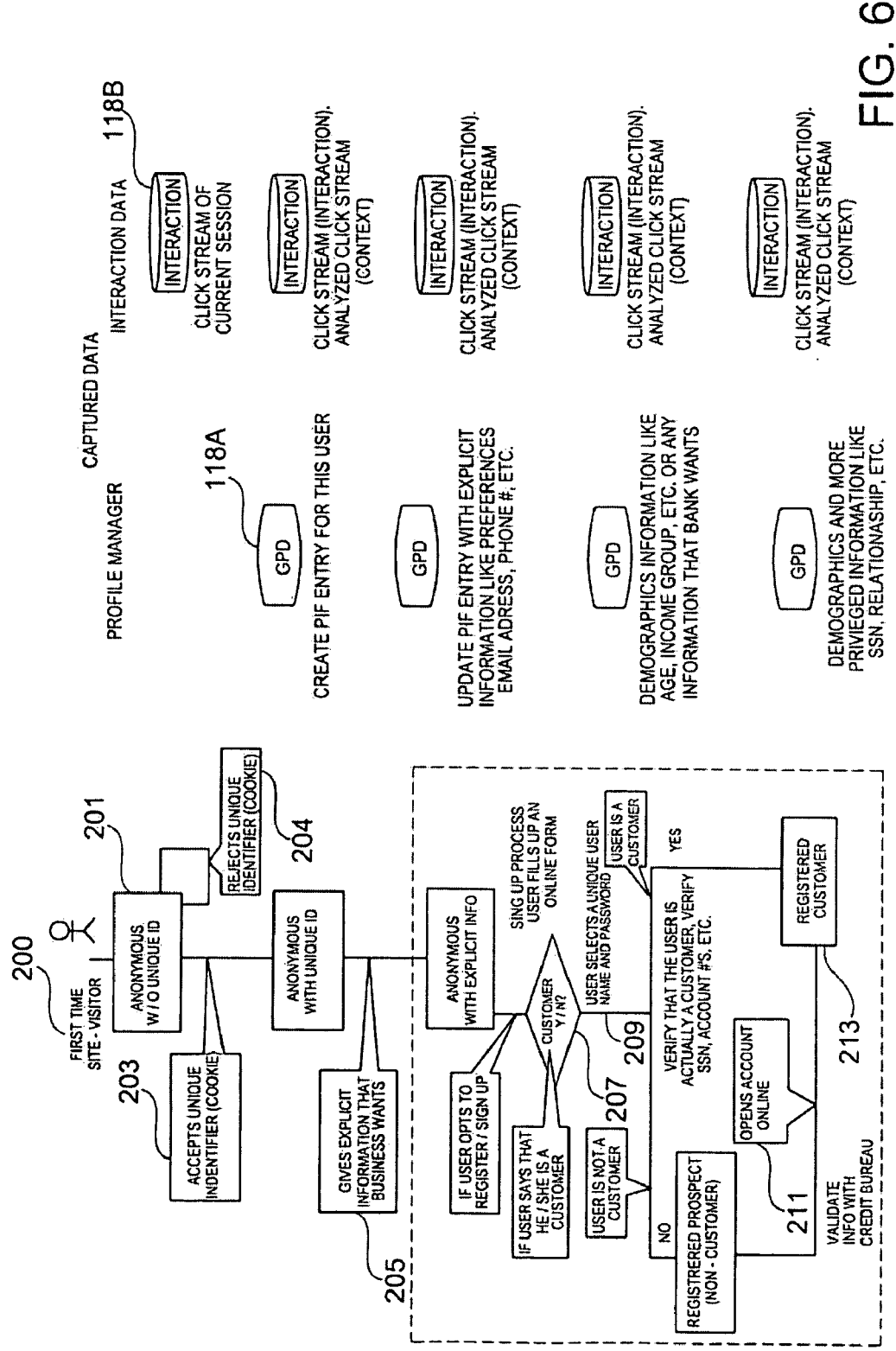

PERSONALIZED INTERACTIVE NETWORK ARCHITECTURE

CROSS REFERENCE TO RELATED APPLICATION

This application is based on, claims priority to and incorporates by reference the subject matter of U.S. Provisional Application 60/165,739 filed Nov. 15, 1999 and entitled "WEB BASED PERSONALIZATION ARCHITECTURE".

BACKGROUND OF THE INVENTION

The present invention relates to a system for personalized interaction over a communications channel between a user and a provider of information/services/goods. In particular, the present invention allows for personalized interactivity between an Internet web site user and the web site provider of information/services/goods. For example, the present invention allows a provider of services, for example, a provider of financial services such as a bank, to interact personally through a customer personalized website with a customer of that financial service provider. Although the invention may be used to personalize the provision of financial services over a communications channel, it is not limited to financial services but can be used to personalize the interaction between a customer and a provider of any products, goods, services and/or information of any kind. In particular, the present invention allows the provider of the information/goods/services to personalize the web site to the preferences of the particular user, for example, preferences such as interests, hobbies, business interests, product/service preferences, etc. Although an example has just been provided of a personalized approach to providing an Internet based service, the invention is equally applicable to any other communications channel including such channels involving interaction through automatic teller machines (ATMs) and other communications devices and kiosks, other communication channels, intranets or extranets, E-mail, telephone communications, faxes, call centers, branch offices, etc.

There are some limited forms of personalized interactive systems presently in operation, in particular, over the Internet. For example, Amazon.com provides a service which can select books for customers based upon their previous selections and preferences. However, these systems are limited in scope, and basically only use what is known as collaborative filtering to infer either what should be offered next or to make recommendations to the user.

Another system patented by Broadvision, described in U.S. Pat. No. 5,710,887, provides for electronic commerce over a computer driven network. An aim of this system is to allow commerce to be conducted across a number of different platforms and networks. Although offering the ability to be implemented over different networks, not just the internet, this system offers limited ability to customize the interaction between the customer and the provider of goods/services so that each customer interacts in a unique way with the provider based on the customer's preference, characteristics, lifestyle, etc. The Broadvision patent creates a participant program object that identifies the participant and contains information about the participant, e.g., name, address, privacy controls, demographic data and payment methods. However, the system is not capable of making knowledge driven decisions about a customer to personalize the interaction with the provider so that it takes into account more in tangible customer characteristics such as preferences, lifestyles, and such customer characteristics as, for example, preferred tone of voice of interaction, decisions about user interests and hobbies, etc., that may be important to making an electronic interaction more "human" or personal.

Another system is described in U.S. Pat. No. 6,014,638, assigned to America Online, Inc. This system however, is directed to an Internet only based system and is not applicable to a system which is adaptable to multiple channels and points of contact. Further, the system of the AOL patent does not allow for personalization in real time, i.e., using current interactions with the user.

SUMMARY OF THE INVENTION

The present invention is broader is scope than the limited systems now available. The present invention aims to manage knowledge obtained from customer interactions and personalize the information/product/services that are offered to the customer as a result of those interactions. The present invention utilizes data obtained from past and present interactions to make decisions about what to offer the customer and about what information/products/services the customer may be interested in. Further, the present invention is directed at totally personalizing the relationship between the customer and the information/service/product provider based upon using all the knowledge which can be obtained from past and present interactions with the customer to personalize the relationship with the customer. In the context of an Internet web site, the present invention personalizes the web site to the customer's preferences, characteristics and interests, etc. and pushes information, products, etc that would be suitable to the customer.

The present invention provides a single, integral single system that allows all channels to utilize the system, thus centralizing knowledge and creating a unique customer interaction experience.

Further, the present invention meets a need to integrate within an information/product/service provider, the various departments of the information/product/service provider so that the various information/product/service providers within a single company, for example, or even amongst groups of companies, can provide a plurality of information/services/products to the customer using an integrated or "cross channel" approach. For example, taking the example of a financial service provider, the present invention allows information concerning an ATM user having a high savings balance to be known to an investment department of the financial service provider so that the financial service provider can provide investment opportunities to that customer. Taking another example, a financial service customer having a high savings balance may be offered information concerning real estate mortgage offerings or loans on the rationale that a customer with a high balance may be saving funds to purchase and/or finance a home. In this way, the system of the invention allows collaboration and cross-fertilization (cross-application) across different channels of an information/service/product provider.

Presently, in many institutions that provide multiple services/products/information, one department providing a particular service/product/information may be totally unaware of prospects known to another department specializing in a different area of that same company or of knowledge that a customer exists in other relationships. The present invention, through an integrated system, will allow the company to be more responsive to the customer's various needs. In effect, the present invention has the effect of ending what is often called the "silo" mentality, i.e., the compartmentalizing of branches or departments in company so that one branch or department is unaware of prospects/customers from another branch or department. A customer or user is defined as anyone who uses the system.

The present invention aims to achieve the above objects by integrating various channels through which customers communicate with the information/service/product provider. The various channels may include the Internet, but also other channels such as phone lines, automatic teller machines, branch offices, bank cards, E-mail, direct mail and most other channels of communication. Further, the system of the invention allows use of multiple channels, e.g., a user may initiate communication using an ATM, but receive a response over the internet or fax or by phone or E-mail. The system allows the customer and provider to interact and allows customer to customer interaction or user to user interaction within a product/service information provider.

According to the invention, the above described objects are achieved by a system for personalizing interaction between a user communicating over at least one communication channel and a provider of information/products/services, the user having a communication device for communication over the channel with the provider, the system comprising; a channel interface for interfacing with the channel; a product/service interface for interfacing with an information/product/service provider; and a knowledge management system coupled to the channel and product/service interfaces, the knowledge management system comprising a knowledge/management repository storing information concerning the user, the information obtained from interaction with the user over the channel including current interactions between the user and the knowledge management system and further for storing information concerning a plurality of information/products/services to offer to the user; and a personalization engine for making a decision as to which of the plurality of information/product/services to present to the user over the communication channel based on the stored information in the knowledge/management repository.

According to one aspect, the system of the invention comprises a plurality of managers, brokers and services that contain and utilize databases and objects.

According to another aspect, the invention comprises a method for personalizing interaction between a user communicating over at least one communication channel and a provider of information/products/services, the user having a communication device for communication over the channel with the provider with which the user interfaces with the channel. A knowledge management system is interfaced with the channel and an information/product/service provider. Information is stored in a knowledge management repository concerning the user, the information obtained from interaction with the user over the channel including current interactions between the user and the knowledge management system. Further, information is stored in the knowledge management repository concerning a plurality of information/products/services to offer to the user. A decision is made as to which of the plurality of information/product/services to present to the user over the communication channel based on the stored information in the knowledge management repository.

According to yet another aspect, the present invention provides a system for personalizing interaction between a user communicating over at least one communication channel and a provider of information/products/services, the user having a communication device for communication over the channel with the provider, the system comprising: a channel interface for interfacing with the channel; a product/service interface for interfacing with an information/product/service provider; and a knowledge management system coupled to the channel and product/service interfaces. The knowledge management system comprises a knowledge management repository storing information concerning the user, the information obtained from at least one of interaction with the user over the channel including current interactions between the user and the knowledge management system; and information obtained about the user from other sources. The knowledge management repository further storing information concerning a plurality of information/products/services to offer to the user; and a personalization engine for making a decision as to which of the plurality of information/product/services to present to the user and for personalizing content of the information/product/services provided to the user over the communication channel based on the stored information in the knowledge management repository.

According to still yet another aspect, the invention provides a method for personalizing interaction between a user communicating over at least one communication channel and a provider of information/products/services, the user having a communication device for communication over the channel with the provider in which the user is interfaced with the channel. A knowledge management system is interfaced with the channel and an information/product/service provider. Information is stored in a knowledge management repository concerning the user, the information obtained from at least one of interaction with the user over the channel including current interactions between the user and the knowledge management system and information obtained from other sources. Information is further stored in the knowledge management repository concerning a plurality of information/products/services to offer to the user. A decision is made as to which of the plurality of information/product/services to present to the user and for personalizing content of the information/product/services provided to the user over the communication channel based on the stored information in the knowledge management repository.

The system of the invention accordingly provides a framework of components, their relationships, functions and purposes for creating and maintaining a personalized interaction that is constant and can be tailored to any communications channel.

Further, the system of the invention can be used with any interactive communication channel and further is applicable to a wide variety of goods/products/services/information including, without limitation, financial products/services, legal products/services, entertainment products/services, government products/services, personal products/services, corporate products/services, consumer/individual products/services and information in general. For example, with respect to financial institutions, information such as payment information, statements, documents and files can be stored. Personalized offerings can be provided to the customer in such areas as archives for legal requirements, product fulfilment and customer service. For law firms, document storage can be provided and the interaction personalized. For example, archives for legal requirements or data mining of intellectual property are some examples of personalized offerings which can be provided by the system of the invention. With respect to entertainment companies, media such as music and video libraries may be stored. Personalized offerings such as consumer sales/global order fulfilment and video and audio screening may be provided. For governmental agencies, forms, deeds, statements and other documents and files etc. may be stored and personalized offerings may be provided with respect to these, for example, personalized data views can be provided. The system of the invention provides convenience, security and efficiency. With respect to personal services and markets, examples of media stored include PC backup, documents, music and video data, which can be used for internal use, customer service or order fulfilment, for example. Corporations can use the invention for documents/file storage, trade materials and/or vault services, for example. These can be used for internal use work flow improvement or order fulfilment.

Other features and advantages of the present invention will become apparent from the following detailed description of the invention which refers to the accompanying drawings.

BRIEF DESCRIPTION OF THE DRAWINGS

The invention will be described in greater detail in the following detailed description with reference to the accompanying drawings in which:

FIG. 1C shows modeling of the data using, for example, the "Papaa" framework (to be described herein);

FIGS. 4, 5, 5A, 6 and 7 are flow charts and accompanying related data applicable to users using a web site which has been personalized and showing the techniques used to personalize the experience and flow;

FIG. 8A shows the technical objects used to construct the personalization manager.

DETAILED DESCRIPTION OF EMBODIMENTS OF THE INVENTION

Figure 1:
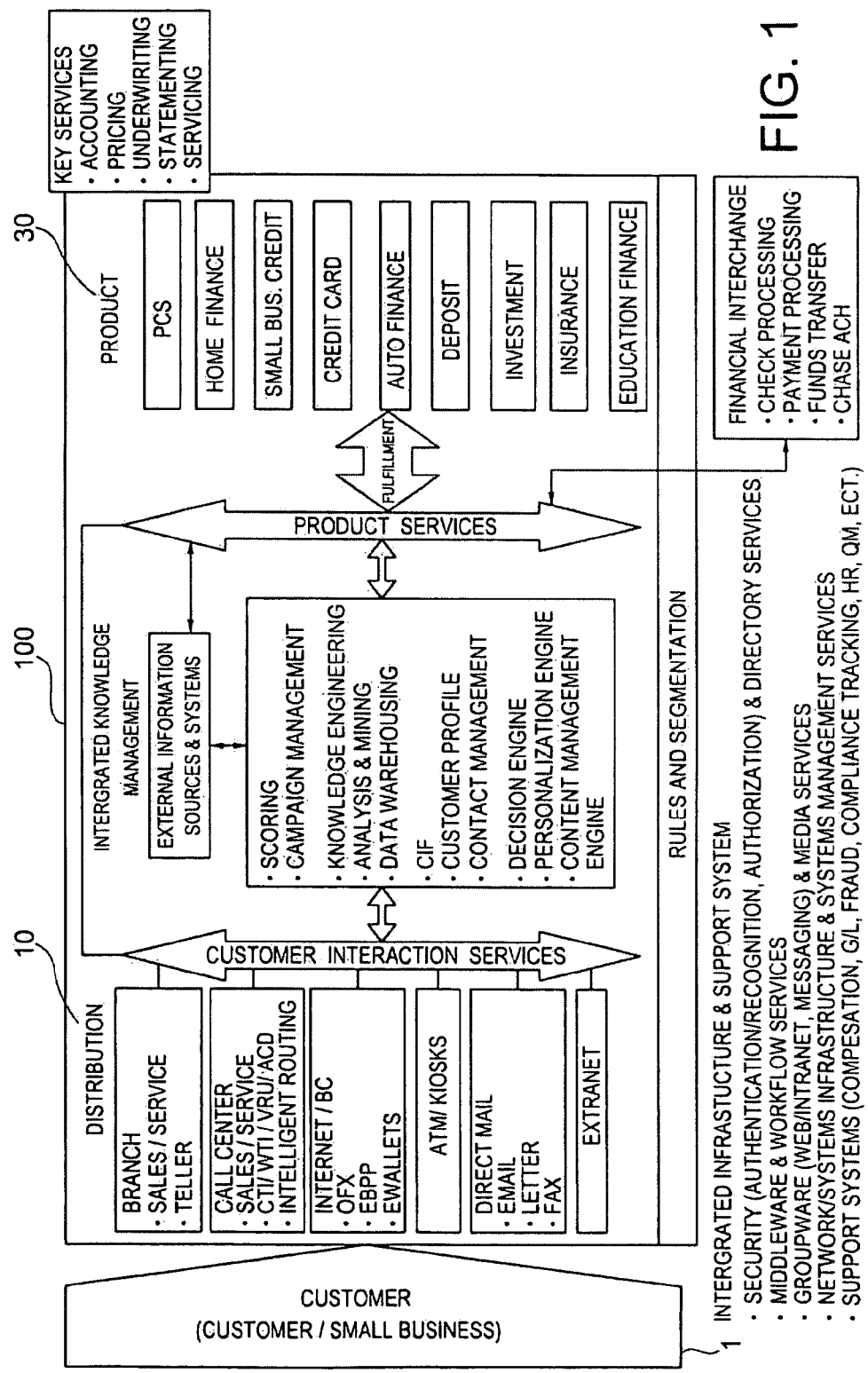
FIG. 1 shows the overall framework for the personalization architecture of the present invention.

With reference now to the drawings, FIG. 1 is an overall block diagram of the architecture of the invention for providing personalized interaction between a provider of information and/or goods and/or services and a customer. A customer 1 interacts with the system through any of a number of distribution channels 10 which may comprise, for example, the Internet, automatic teller machines/kiosks, direct mail (email, fax, letter, etc.), Extranet, an Intranet, call centers, and branch offices, without limitation. The system includes an integrated knowledge management component or personalization system 100 to be described in greater detail. The component 100 implements such functions as scoring (propensity rating), campaign management, knowledge engineering, analysis and mining of information, data warehousing, forming customer profiles, providing customer profiles, and contacting management. The system component 100 includes a decision engine to make decisions to enable the system to personalize the interaction, a personalization engine to personalize the interaction and a content management engine amongst other components, referenced later. The system enables personalization of the interaction between the customer and an information/product/service provider offering information/product/service 30 that the customer desires. For example, as shown by items 30, in the case of a financial institution, the products or services may comprise items such as home finance, small business credit, credit cards, automobile financing, savings deposits, other investments, insurance, education financing, etc. The system includes the necessary means to achieve product fulfillment. Although financial products 30 are shown in FIG. 1, the system is equally applicable to other information/services/products, such as goods or information. Integrated in the system are the necessary means for providing security, authentication/recognition and authorization directory services, middleware and workflow services, groupware such as web/Intranet messaging and media services, network systems infrastructure and systems management services and support systems such as compensation, fraud and compliance tracking systems, etc.

Figure 1A:
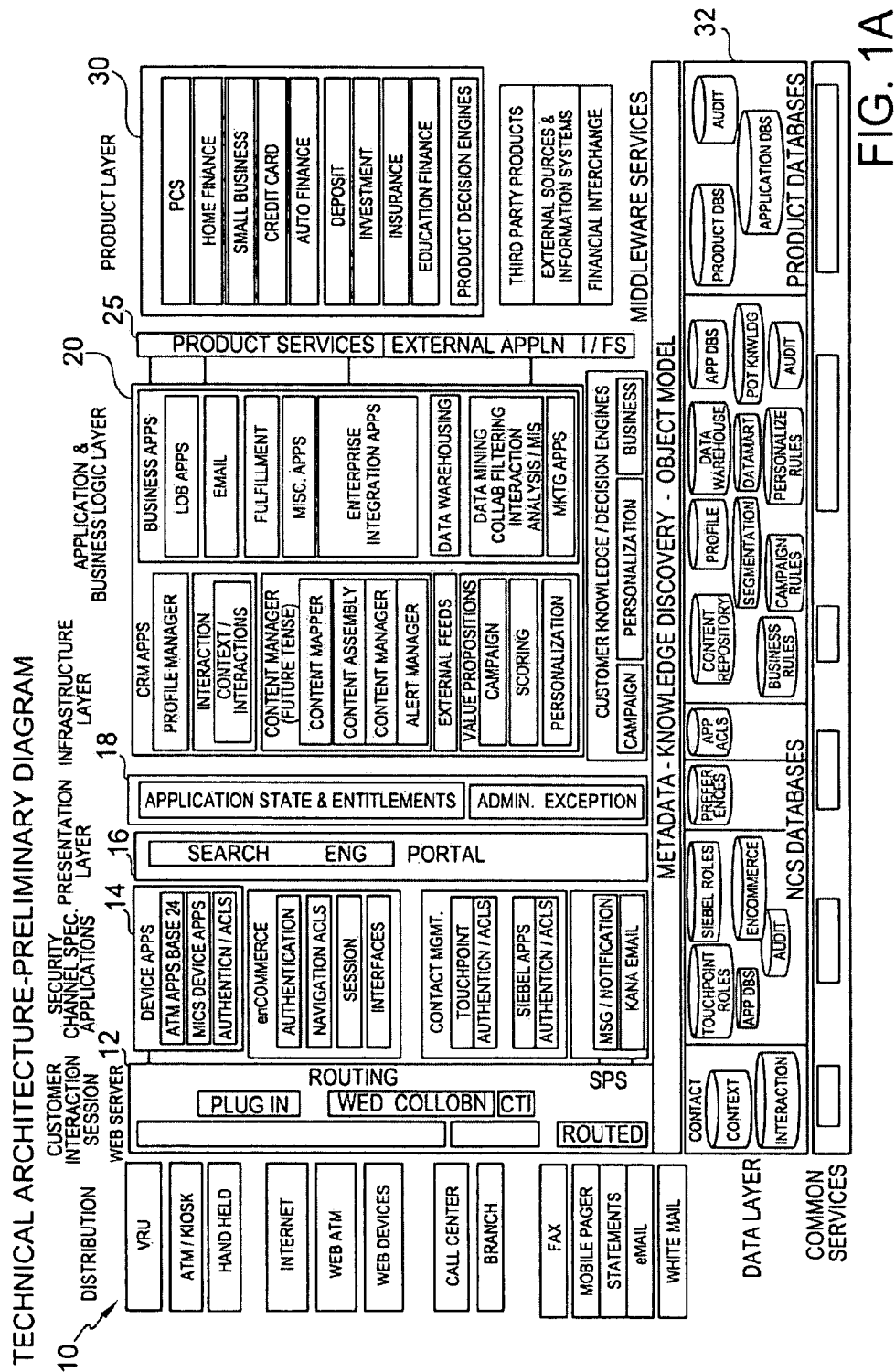
FIG. 1A is a linear technical architecture diagram showing the various layers of the system of the invention and their applicability to various input channels and products and/or services, their relationships and interactions; this drawing uses time with zero minutes being the distribution channel with 1+ being the product layer.

FIG. 1A is a linear technical architecture diagram showing the overall technical architecture of the system in the form of layers. It shows the interaction from the distribution channels 10 on the left to the product layer 30 on the right. For example, if a person interacts with the system via the Internet, the customer interaction session 12 is direct. The customer interacts through an authentication application 14 which provides work flow, entitlements, and allows beginning a session on the system. As the user crosses this layer, the user also registers the session and retrieves any alerts/messages for the user. A presentation layer 16 is then used to access the system. The presentation layer shows the relationship—the total view—to the user. Infrastructure layer 18 is the administration layer that allows the system to be maintained and administrated. An application and business logic layer 20 includes the various applications and business logic, to be described in detail below. The layer 20 then interacts through an information product/processor layer 25 with information/product/services 30 in the product layer.

Interacting with the various layers is a metadata-knowledge discovery-object model 32 which includes various data bases and services. These databases include a contacts database (db), work flow db, security db, audit db, customer preference db, entitlement db, content db, application db, data warehouse db, data mart db, profile db, segmentation db, business rules db, campaign rule db and product db, in addition to others.

Personalization is the ability to deliver targeted products, services and information tailored to the user's preferences, interests and needs. Personalization allows the creation of a customer experience which reflects the relationship and the customer's requirements, also called "customer centric" experience. Furthermore, with respect to interaction via an Internet web site, personalization allows filling "white space" which can be described as the ability to promote an interaction with messages and other personalized components using matching and selection based upon the customer's profile, contacts, indications or assumptions derived through analysis, past interactions or contacts and the current interaction. The system is designed to adapt to all touch points or channels and all devices of interaction. Personal information can be static or dynamic based on a customer's explicit/implicit preferences and historic data or dynamic based on real time assessment of the next best step.

Personalization is adaptable to all channels, as described above, such channels as the internet, extranet, phone lines, e-mail, automatic teller machines, branch offices, etc.

Personalization of the interaction between customers and providers of information/goods/services is driven by a number of factors including environmental factors and business goals. With respect to environmental factors, such factors as commoditization of a particular industry, the disappearance of geographical boundaries, the dissolution of product identities, consolidation and competition have caused a need to distinguish one's products and services from those of others and to build a system to obtain this distinction through personalization of the interaction with the customer.

Business goals also drive the need for personalization. A customer feels more appreciated and more involved if there is personalized interaction. Further, personalization of the interaction empowers a customer and creates an environment supportive of selling information/goods/services or cross-selling information/goods/services amongst different departments of a provider of information/goods/services. Solutions are tailored due to knowledge of the customer.

The present invention provides a means to personalize an interaction via various communication channels between a customer and a provider of information/goods/services. The present invention allows a customer to interact with the provider through a preferred channel and at the customer's convenience. The system allows personalization of that interaction so that the customer is recognized and the customer's needs anticipated. The system allows advising the customer and providing access to all information/products/services offered by the provider. Further, the system allows the provider to provide customer tailored packages, i.e., non-standard packages. Furthermore, the system allows for continuously gathering, analyzing and distributing information to make the customer receive a more rewarding experience and interaction with the provider. Moreover, the system creates a basis for retaining customers, better servicing customers, and tailoring solutions as a result of the personalization provided by the system.

According to the invention, once a customer contacts the provider through a communications channel using the personalized system of the invention, the first step is identification and authentication of the customer at the start of the session (The security layer 14). This triggers the collection of a real time, customer profile which, created and combined, provides the basis for the delivery of a personalized experience. The same functions and information are made available at each touch point, i.e., through each channel. The actual experience that the customer has will be adapted to the customer's preferences and the capabilities and environment at that touch point. A decision engine provides key parameters for the real time assembly of the experience. Other parameters are the capabilities of the touch point and the course of the dialogue, for example, the click stream if communication is over the internet. The system is capable of interacting with the customer over a wide range of communication channels, however.

A Profile Manager, to be described in detail later, is the central coordinator and manager for all user profile related information. The Profile Manager is designed to be a service broker with appropriate directory service and repository support and it mediates access to all user profile related information. Sub-components of the profile manager provide services such as authentication and authorization, aggregation of profile attribute including user preferences, segmentation and campaign targeting/tracking information for the user, contact information, and outstanding commercial and services issues ("workflow process" status).

Value propositions i.e., offers to be made or information to be presented to the customer, are matched with the customer profile needs and preferences and delivered at the right time and the right place. Each session will update the customer profile, trigger follow-up activity and provide data for customer interaction analysis and fine tuning of the customer dialogue and the value proposition (offer).

The steps in the personalization process include adaptation to the channel, selection of functions, navigation screens and templates which take into account the specifics of the communication channel. The system customizes the experience based upon predefined navigation, language and tone of voice, metaphor including color scheme graphics and layout. News and messages can be provided to the customer.

Further, the system personalizes the process by content selection, based on preferences and customization rules. The system provides news and topics to the customer using searching and filtering technologies.

Further, so called "white space" in the customer display can be filled with propositions, actions, alerts, notifications etc., decided by rules based on, for example, customer preferences or analysis of the customer profile.

In addition, the system can predict needs and can propose actions or recommendations based on matching of user profiles and behavior of like minded people. The system determines next steps based on analysis of the current interaction, obtains feedback and learning to be captured in the customer knowledge base and includes a rule oriented data base for application of personalization to thereby personalize information, offers, terms, conditions and financial advice, etc.

Figure 1B:
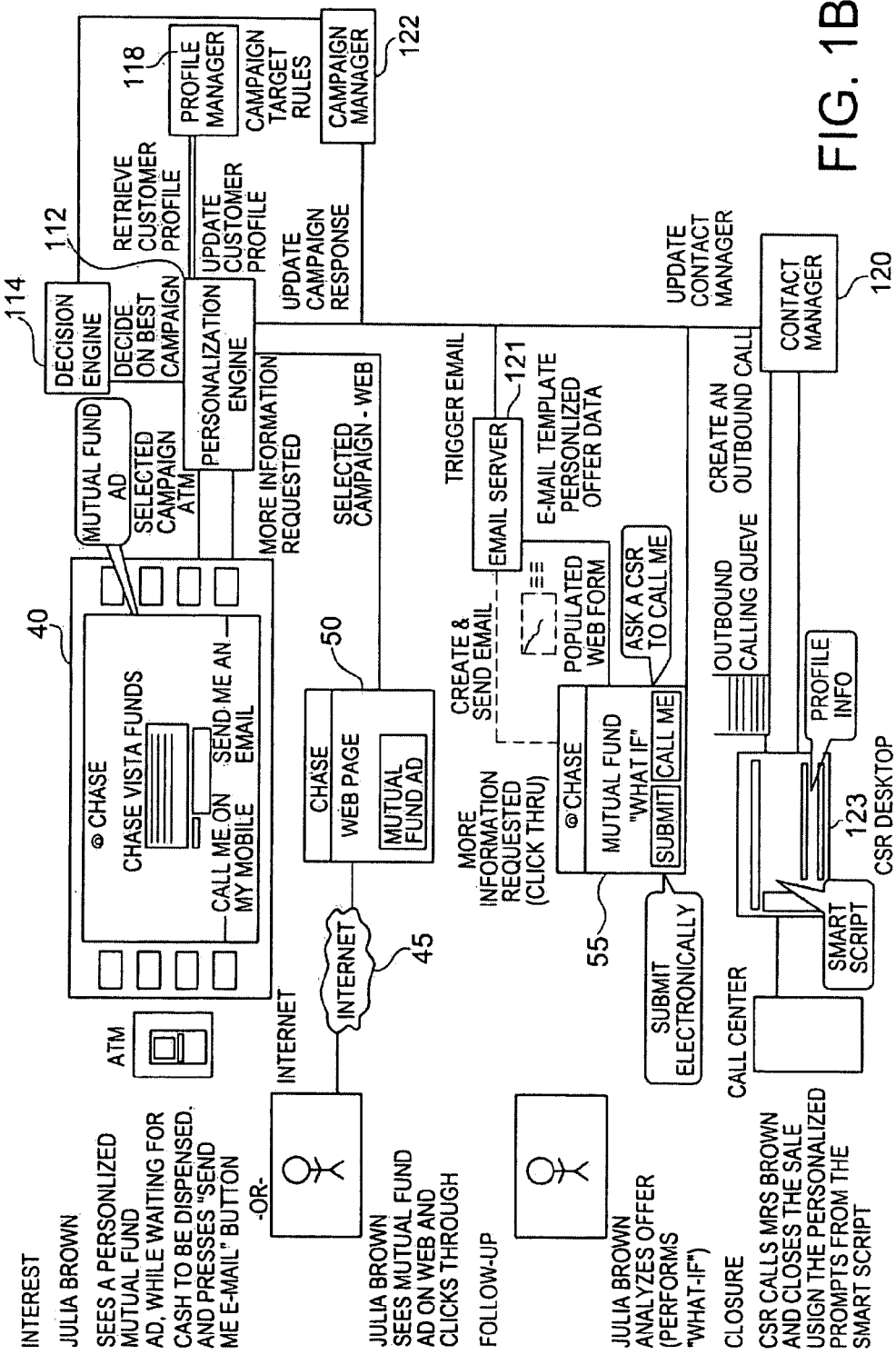
FIG. 1B shows an example of operation of the system illustrating a case study demonstrating the components involved.

FIG. 1B shows an example of how the system operates. FIG. 1B shows one example of how the system personalizes in a cross channel environment the interaction with a customer. The customer in this particular case is a customer of a financial institution having a high average savings balance, for example, greater than $10,000.00, a credit card and a mortgage. The customer's characteristics are shown at 1A in FIG. 1C, along with the financial products, agreements and accounts 1B utilized by the customer.

Figure 17:
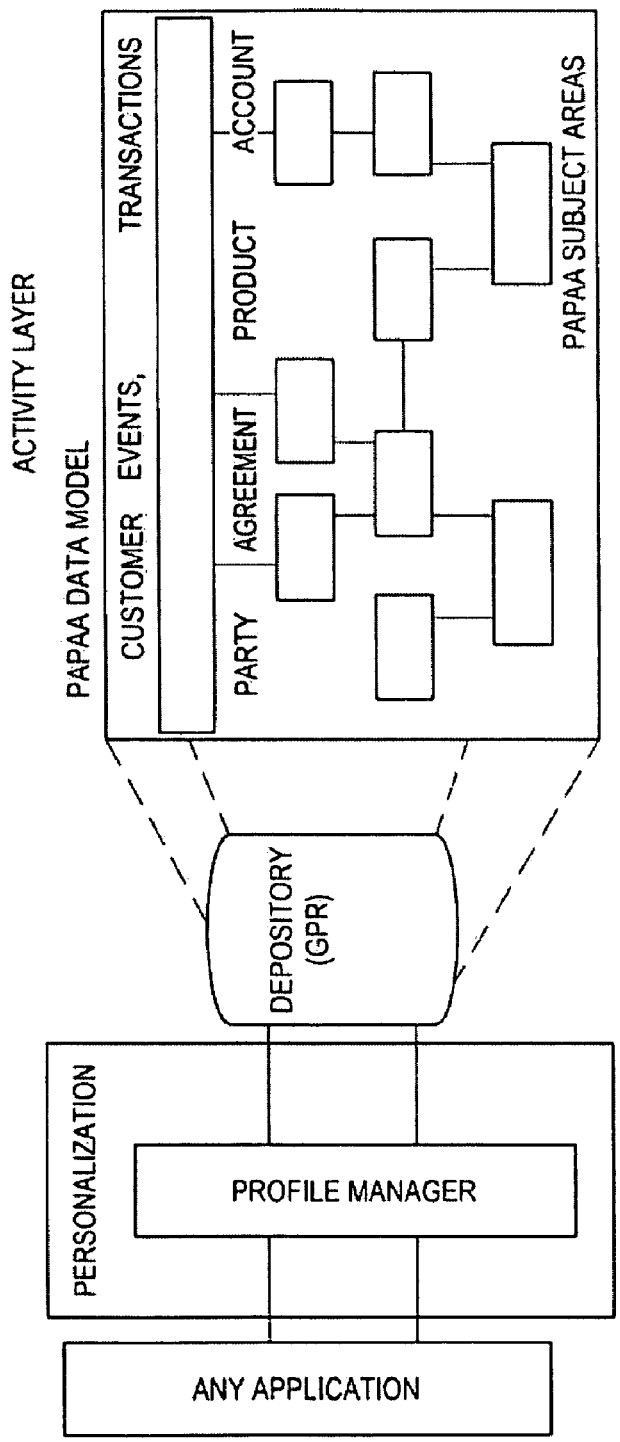
FIG. 17 shows the Papaa model.

FIG. 1C shows an example of how the system would use various data for this particular case study, i.e., the case study of FIG. 1B previously referred to. The customer has various demographics, preferences, values, financial objectives and a lifestyle (1A). Further, the customer has various agreements, if the service provider is, for example, a bank, such as credit cards and a mortgage (1B). Accordingly, the user makes use of various products such as credit cards and a mortgage from the service provider, in this case a bank. The user also may have accounts with the bank as shown. The system of the invention may also maintain a plurality of campaigns, contact lists, campaign responses, campaign priorities, etc (45). Campaigns may be, for example, programs currently offered by the provider to customer prospects. The system further incorporates business/marketing rules and decision factors, target indicators, etc. (47) for determining which campaign to target to a particular user based on the rule/factors. This data model—called Papaa for applications in the banking industry—allows all personalization data and actions to be modeled. This data framework allows for a multi-channel, multi-action system to be unified for mining and audit of information. Papaa is an acronym standing for "Party-Agreement-Product-Account-Activity". It is an object relational framework. The object model defines the business logic and services to insulate interfaces from the physical, relational database layer. The relational model offers the flexibility needed to address and support evolving entity attributes. Papaa is a framework defining the Global Profile Repository, discussed herein, for Personalization, supporting the needs of the profile manager. The Papaa model is show schematically in FIG. 17.

Referring again to FIG. 1B, a campaign manager 122, to be described in detail later, is programmed to run various campaigns (FIG. 1C), for example, offering a credit card, currency on the go, home equity loans, a mutual fund and/or small business services. Based upon the customer profile managed by profile manager 122, a personalization engine 112 selects, for example, a mutual fund campaign to display on an ATM screen 40 while the customer withdraws cash. The rationale for this decision is the high average savings balance maintained by this customer. There is a likelihood that this customer will desire to invest in a mutual fund. Further, this decision may be based on other information available to the system including lack of any knowledge of significant upcoming life events, a comfortable lifestyle and internal business/marketing rules. Should the customer be interested, the customer will express interest by touching the ATM screen and ask to be provided with further details, for example, by E-mail or any other means. E-mail can be sent with the information via e-mail server 121 and a link to a web page 50, and an electronic form 55 may be forwarded to the customer which can be used to complete the sale.

As FIG. 1B shows, alternatively, the customer may interact initially with the system by the Internet 45 in which case the mutual fund ad is displayed on a webpage 50. The customer then has the option of communicating via the web site with the provider to consummate a transaction. Alternatively, another inbound and/or outbound communication channel(s) could be used, e.g. telephone, etc.

The personalization engine 112 is coupled to a decision engine 114 making each personalization decision at an appropriate time, in this case, on the best campaign to present to the customer, also weighing which is the best option for the user. This is performed based on business/marketing rules 47 (FIG. 1C) and the customer's profile. A profile manager 118 contains the profile of the customer which is retrieved and provided to the personalization engine 112 and which the personalization engine contact manager 120 updates based upon further interactions. The campaign manager 122 is coupled to the personalization engine 112 to provide any of selected campaigns for presentation to the customer. A contact manager 120 is also provided which is updated by the personalization engine 112 and records all the contacts with the users of the system (user and provider). The CSR (customer service representative) is alerted by an event manager to call the customer to provide further information or to close a sale.

Figure 2:
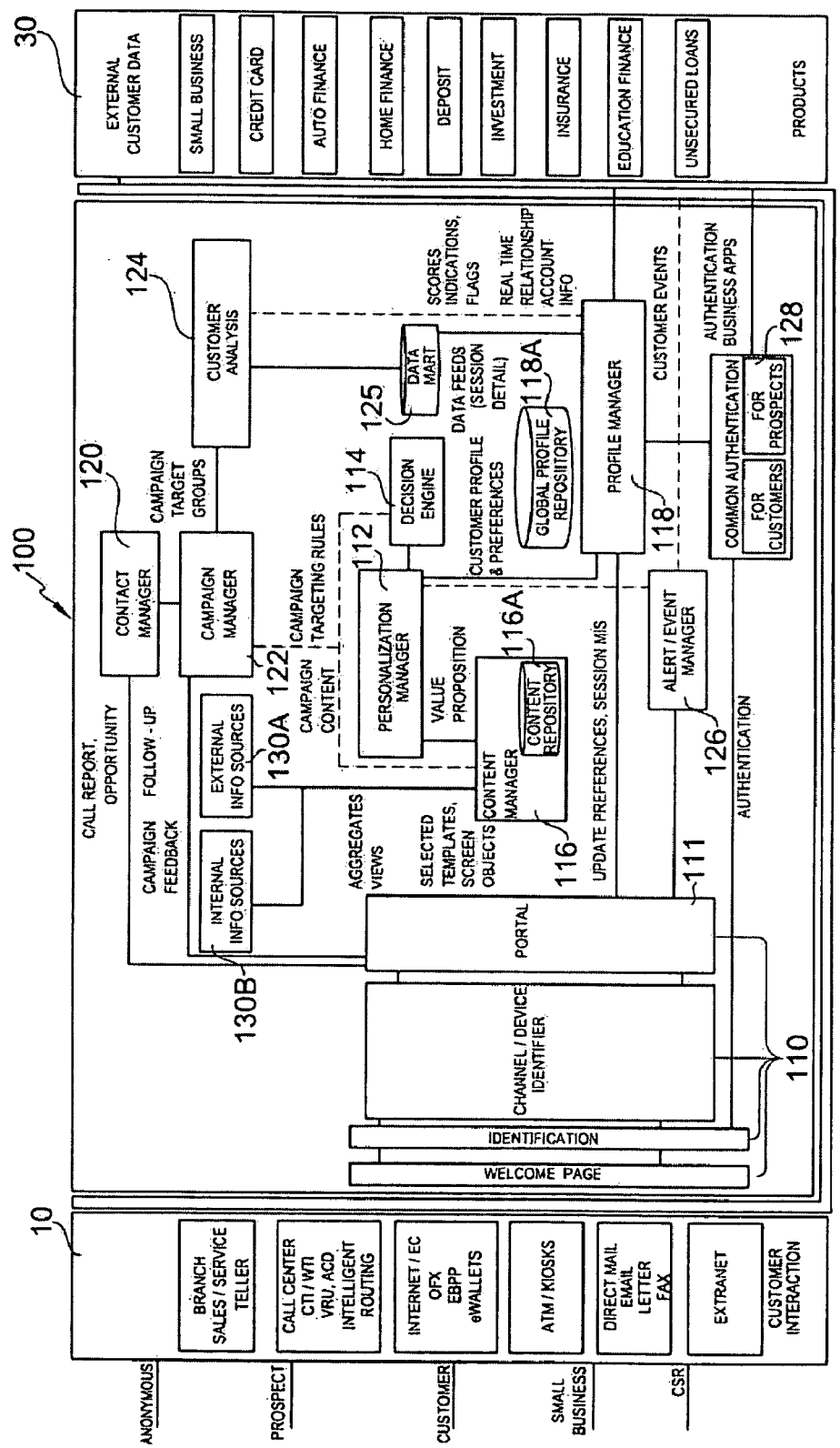
FIG. 2 is a more detailed block diagram of the basic components of the personalization architecture including the distribution channels and product processors.

With the above in mind, reference is now made to FIG. 2 which is an overall block diagram of the system of the invention. The customer interacts with the system via various channels 10, as previously described. The various products or services are shown at 30 as previously described. The personalization system (integrated knowledge management system) is indicated generally by reference numeral 100. As described previously, to illustrate how the system operates in a particular case, the system's primary components include interface identification components 110 including a portal 111 for interfacing with the channel 10 by which the customer interacts with the personalization system. The system 100 includes the personalization manager 112, previously described, for personalizing the interaction, the decision engine 114 which makes decisions concerning personalization, a content manager 116 which assembles and maps content to be provided to the user by providing selected templates and screen objects and a profile manager 118 which creates and caches the customer profile based upon previous interactions and other information concerning the customer profile stored in a global profile repository 118A. The system further includes a contact manager 120, campaign manager 122, customer analysis component 124, alert/event manager 126, authentication component 128 and various information sources, internal and external, shown at 130.

With reference to FIG. 2, the portal 111 serves as an entry point and common connector that interconnects the various components. Components of the portal 111 include a repository which contains metadata about screen objects, customer authentication/ACLs, preferences, profile, etc., a publish/subscribe engine, customer agents to deliver subscribed events/messages, search engine-key word and boolean/crawler/filter engine, etc. Portals control and administer the user's complete "view" (what they see and how it is organized in each channel based on user's preferences and entitlements etc.). Portal capability is essentially cross channel. Portals provide the customer the capability to customize their view and tailor the view according to their preferences. They typically offer content folders to organize content into multiple logical groups which may be shown in separate view zones i.e., transaction data, published information such as stock quotes, "white space' content driven by personalization and marketing, static information, etc. User preferences can be channel specific (Internet has a certain view while call centers should answer pre-configured view or queries) and context specific (i.e. specific view while looking at for example, account balances).

The portal may use a single sign-on (SSO) server 198 (FIG. 3), to be described later and the profile manager which collects the data for customer authentication and authorizations. The profile manager maintains a membership directory containing the information necessary to authenticate and assign entitlement roles to each customer. It provides a single sign-on across all the web/application servers. It displays an individual navigation menu with all the enterprise resources/services the customer is authorized to access. The menu reflects the customer's entitlements, and work flow which are obtained in real time based on the customer's current relationship with the information/product/service provider.

The Profile Manager 118 manages all the details related to the user's profile. This component is essentially a service broker, which maps and mediates access to all user profile related information, which may be maintained on multiple systems. These include user authentication and authorization, profile attributes, user preferences, user-campaign tag lists and related data, contact information etc. While all the above are not accessed through the Profile Manager, it provides the data and service directories to access this information as a service broker.

Some of the data elements related to a user's profile may be generated by other systems directly i.e., contact information or campaign tag lists. However, the Profile Manager will provide reference maps and services to access this information. Some other profile elements may be accessed only through the profile manager i.e., core profile elements.

The Profile Manager is considered the master reference for all user profile related data. The Global Profile Repository (GPR) acts as the central directory or repository of all the data mappings, references, services. The actual data elements may physically be distributed in different databases (part of a common CRM data model).

The menus provided to the customer also reflect customer profiles, preferences and subscription services. Profiles and preferences are managed by the profile manager 118. The key functions of the profile manager 118 include managing customer relationship events and assembling customer profiles using an LDAP based customer directory which provides linkages to all systems containing customer data and has supplementary customer information such as preferences, interests, etc.

If the internet is the chosen communication channel, as soon as the customer opens the home page, the portal 111 delivers personalized assembled information relative to the customer's profile. This automatic assembly of content is done by the content manager 116. The personalization is achieved via the personalization manager 112.

Figure 3:
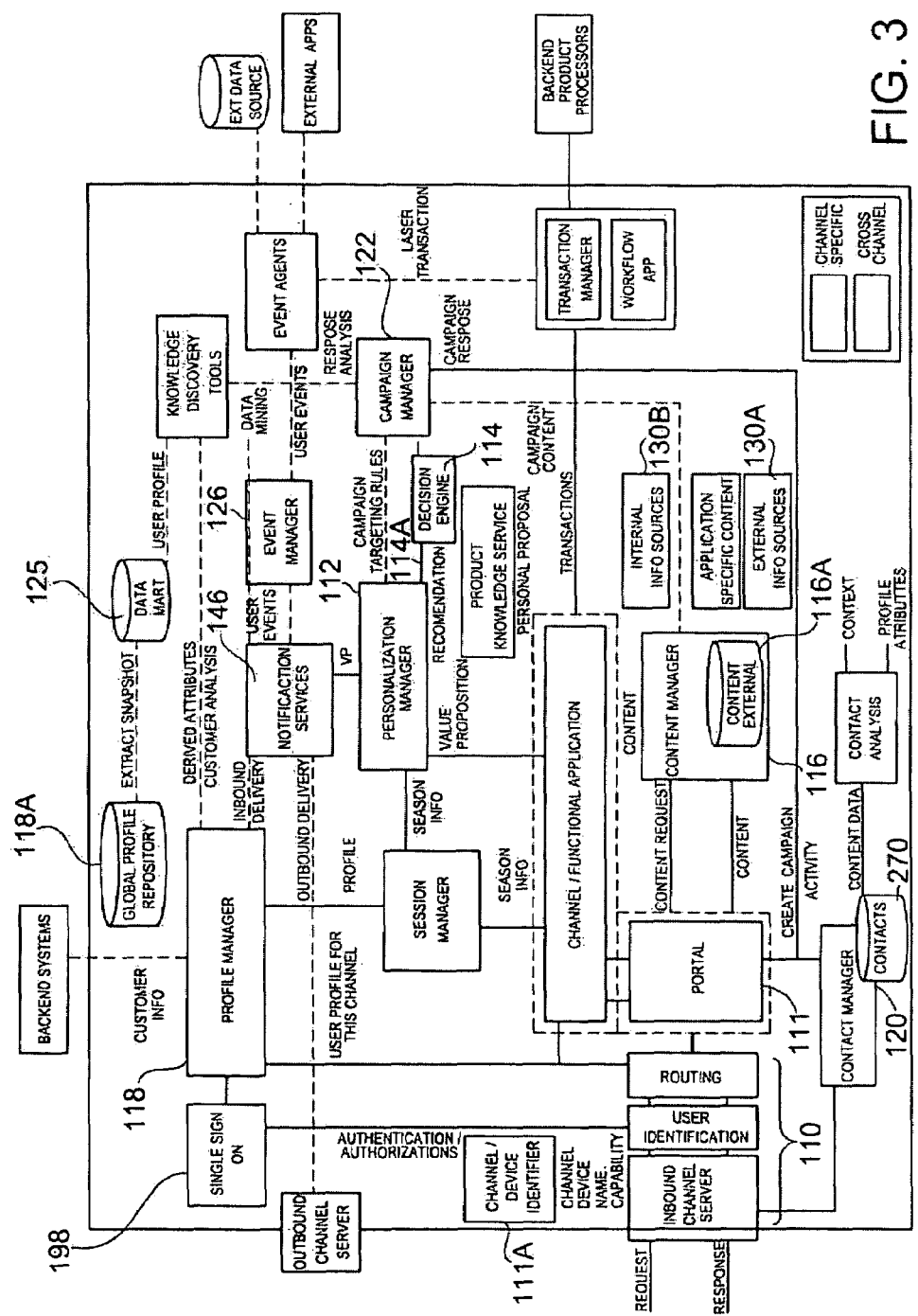
FIG. 3 is a yet more detailed block diagram of the personalization architecture of the invention, including components, relationships and flows.
Figure 4:
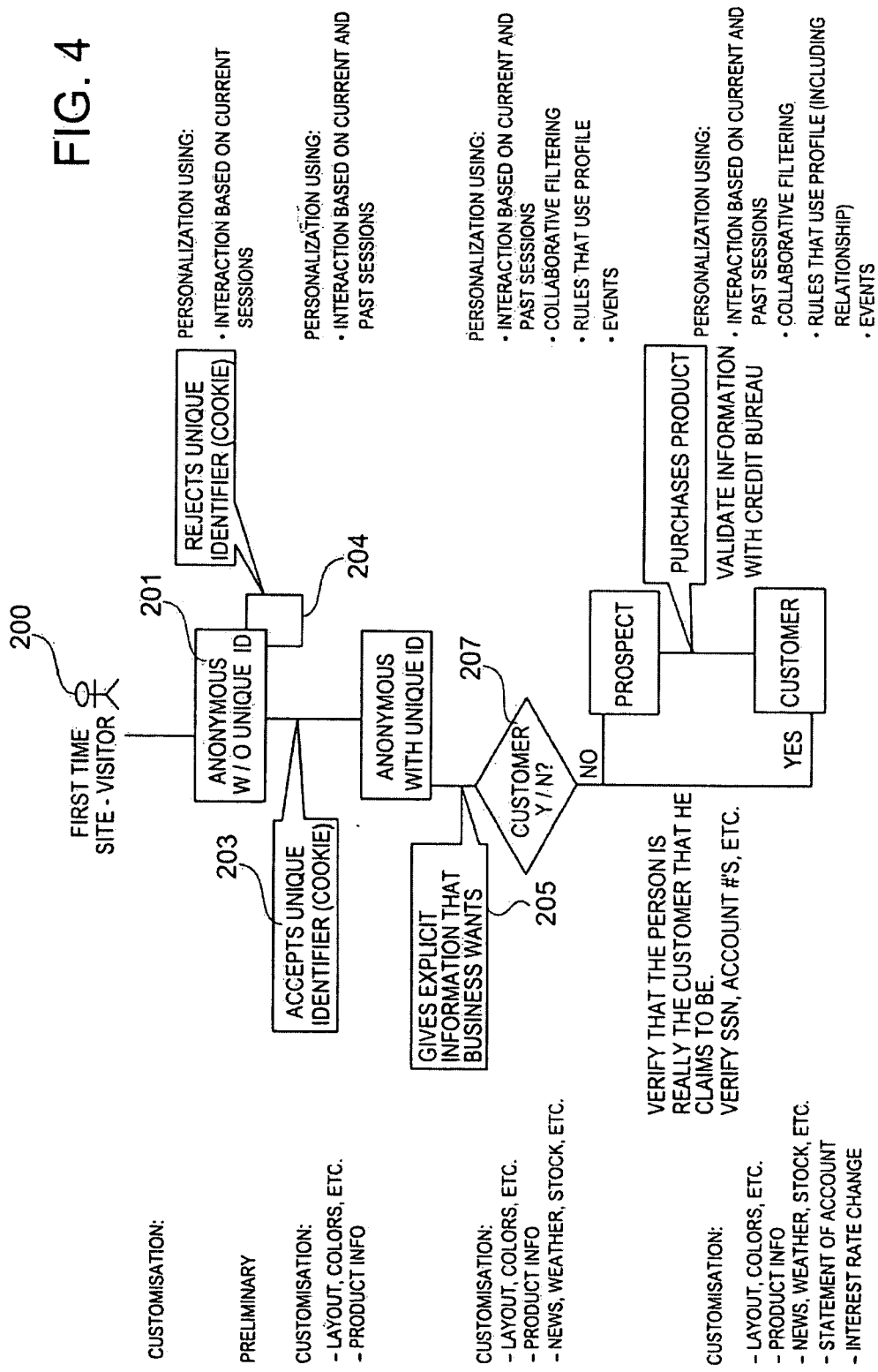

The content manager 116 aggregates content from multiple sources. Content sources may be of two categories, either static or dynamic. Static content may come from external feeds 130A, for example, weather, news, stock quotes, etc., and also from internal feeds 130B, for example, product/service knowledge. Static content is served directly by the portal 111 but stored/retrieved from the content manager 116. Dynamic and personalized content is served by the personalization manager 112, based on rules, work flow, interaction, campaigns and collaborating filtering, amongst other techniques. The content repository 116A contains the actual screen content objects, for example, HTML files, images and applets. FIG. 3 shows the system of FIG. 2 in more detail.

The Portal 111 contacts the Content Manager 116 component for content elements. The Content Manager manages the content components delivered to the user. The Content manager may assemble content for channels when that is technically possible (i.e. Internet and e-mail) and will request content to be delivered in other channels where content is assembled by the channel specific application. However, content elements related to personalization will be mapped into the content manager (may or may not physically hold and assemble) and referenced by channel adapters which do their own content assembly and delivery.

For example, most of the content for channels like the Internet is stored in the Content Manager's repository 116A and assembled by the Content Manager, whereas contents of traditional ATM screens will be based in the ATM driver or ATM itself, with personalized messages mapped and referenced from the content manager. The Content manager maps and assembles content from its own repository, business applications (transaction systems), other static and dynamic internal and external sources, and resources referred by the Personalization Manager etc. Content elements for personalization will be decided by the Personalization Manager 112 based on the provider's personalization strategy, as reflected by commercial rules etc.

The customer analysis (data mining) component 124 utilizes the datamart 125 to produce campaign rules, decision rules, and profile elements. The campaign manager 122 exports campaign rules to the personalization manager 112 and decision engine 114 and campaign content components to the content manager 116. Campaign response tracking is used to provide a real time feed back loop on campaign effectiveness. Customer interests and other campaign events are tracked in the content manager 116 for follow-up.

The personalization manager is the hub of the system. It is a broker which retrieves, weighs and sorts. The personalization manager 112 gets interaction events, collaborative filtering results and customer profile/preferences as input. It organizes and passes these inputs to the decision engine 114. The decision engine 114 evaluates the inputs against its marketing/campaign intelligence rules stored therein to come up with a decision or recommendation 114A. The decision is used by the personalization manager 112 to prepare value propositions (offers), best next steps and/or content to be presented to the customer. The personalization manager 112 can also inquire of a collaborative filtering engine, not shown in FIG. 2 or 3, but to be discussed in detail later, which makes decisions based on analysis of like minded customers. Further, it can make decisions based upon an interaction analyzer which analyses the current interaction, for example click stream analysis, to make a recommendation.

The Campaign Manager 122 generates and manages reports such as click stream analysis, interaction analysis, customer analysis, campaign response analysis etc. MIS Reporting—data marts—customer data marts hold customer and transaction information and are accessed by customer analysis components to assist campaign generation and targeting, segmentation, distilling of profile attributes etc.

The Personalization Manager 112 component is a service coordinator and receptacle that provides required services and data support for personalization. Essentially the personalization manager abstracts requests for personalized content and helps manage other functionality/services associated with personalization (such as decisioning, campaigns etc.). It accepts campaign rules from the campaign manager and executes the rules in the context of the user with the help of decision engines. This component can reference profile variables through the profile manager (tag lists, attributes etc), specific transaction values, event data, session data, etc (made available to decision engines as variables influencing a rule). It can also accept, store and retrieve personalization and campaign related status in appropriate data repositories.

The Contact management 120 component aggregates and makes available cross channel contact information across the product/service/information provider. All contacts, both inbound and outbound, generate information about the context of the contact (in what context the contact happened i.e., customer wanted to withdraw money, had a service request etc.) And the interaction that occurs during the contact (how the user interacted i.e., what was user's click stream or dialogue with the CSR). For example, the user may ask for all account balances, how much money can be transferred at a time etc. before transferring money. Here, transferring money is the context, but the interaction includes all the activities that happened during the inter-action. The view of the contacts made available at the different points will be based on the user of the information (decided by business needs) and will be mediated through contact manager services. The data may physically exist in multiple systems.

The event manager 126 component provides a publish and subscribe mechanism for events. An event is a stimulus that triggers an action. Events may result in a notification that can be delivered via multiple channels. For example: the event that a check has bounced can generate a notification to a customer and/or CSR. (The process of notification is at times referred to as Alerts. However, for clarity and to avoid confusion with the alert manager sub-component of the content manager, the term notification in this document issued to denote such alerts). The action could be executed by provider staff or by a provider business application or a messaging/notification sub-component system Services of the channel/device identifier component 111A are used to determined the channel through which the user has accessed the provider as well the capabilities and characteristics of the device (i.e. browser type, security level, hand held device type, graphics support, type of ATM, link speeds etc.) The format and type of content (including functions permitted on this channel/device) presented will be based on this identification. This component, nevertheless, does not do any modification to the content or participate in delivery of the content.

Turning now to FIGS. 4-7, these figures show the initial interaction of a site visitor with a website personalized by the system of the invention. For a first time site visitor 200, if anonymous and without a unique identification (201), the customer has an option to accept (203) or reject (204) an identifier. At this stage, personalization is based only on interaction based on current sessions, since there is no profile or history. Customization at this stage may relate to layout, colors, and product/service offerings. Assuming the customer accepts the identifier (cookie), personalization can now be based on current and past sessions and information passed by the cookie. When the customer gives explicit information (205) that the business provider wants, personalization is then based on current and past interaction, collaborative filtering, rules using the customer profile and events. A determination (207) is then made whether the customer is the customer that he claims to be by various authentication techniques, for example, social security number, account number, etc. Customization at this stage can include layout, colors, product information, news, weather, stock quotes, statements of account, interest rate charges, etc.

Figure 5A:
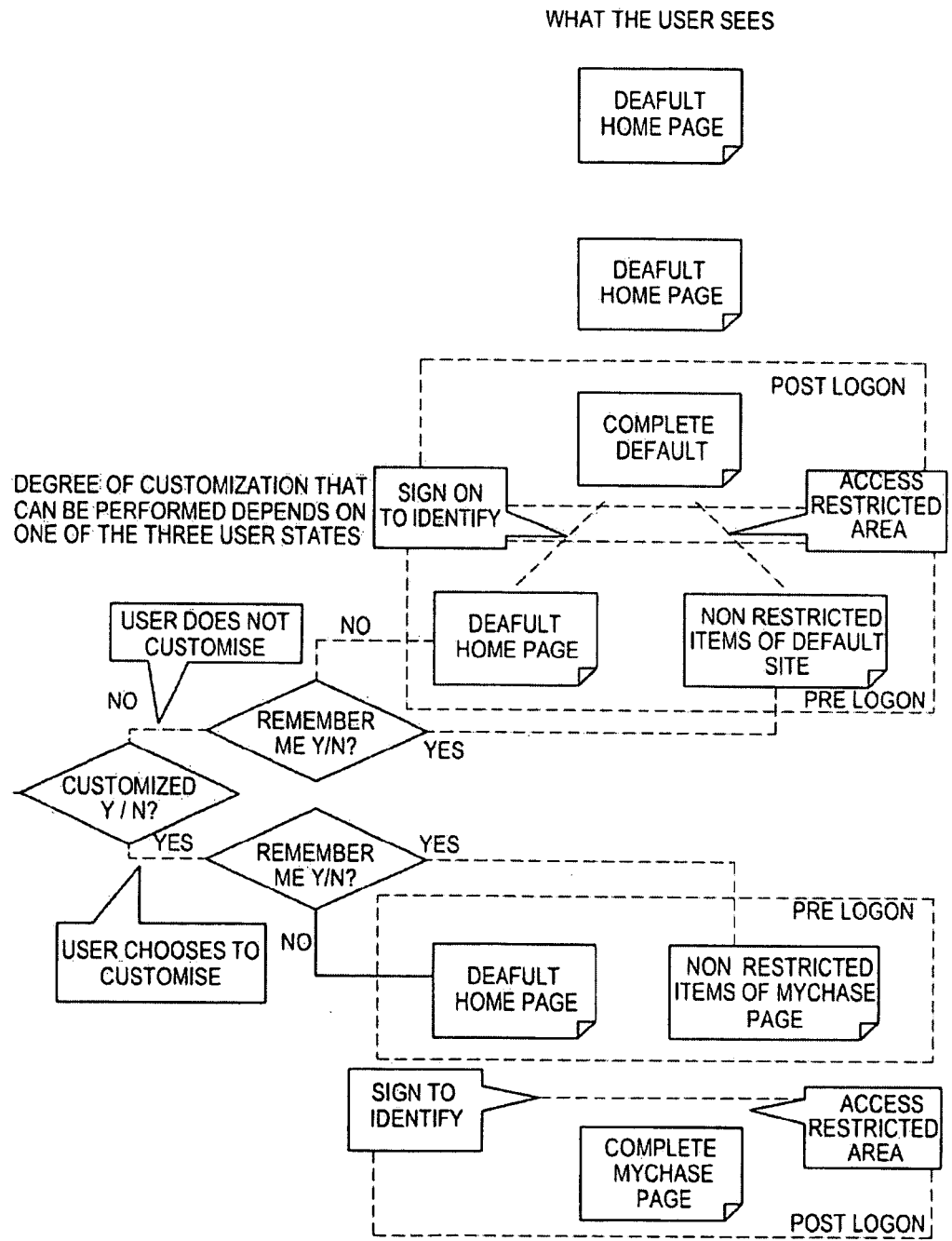
Figure 7:
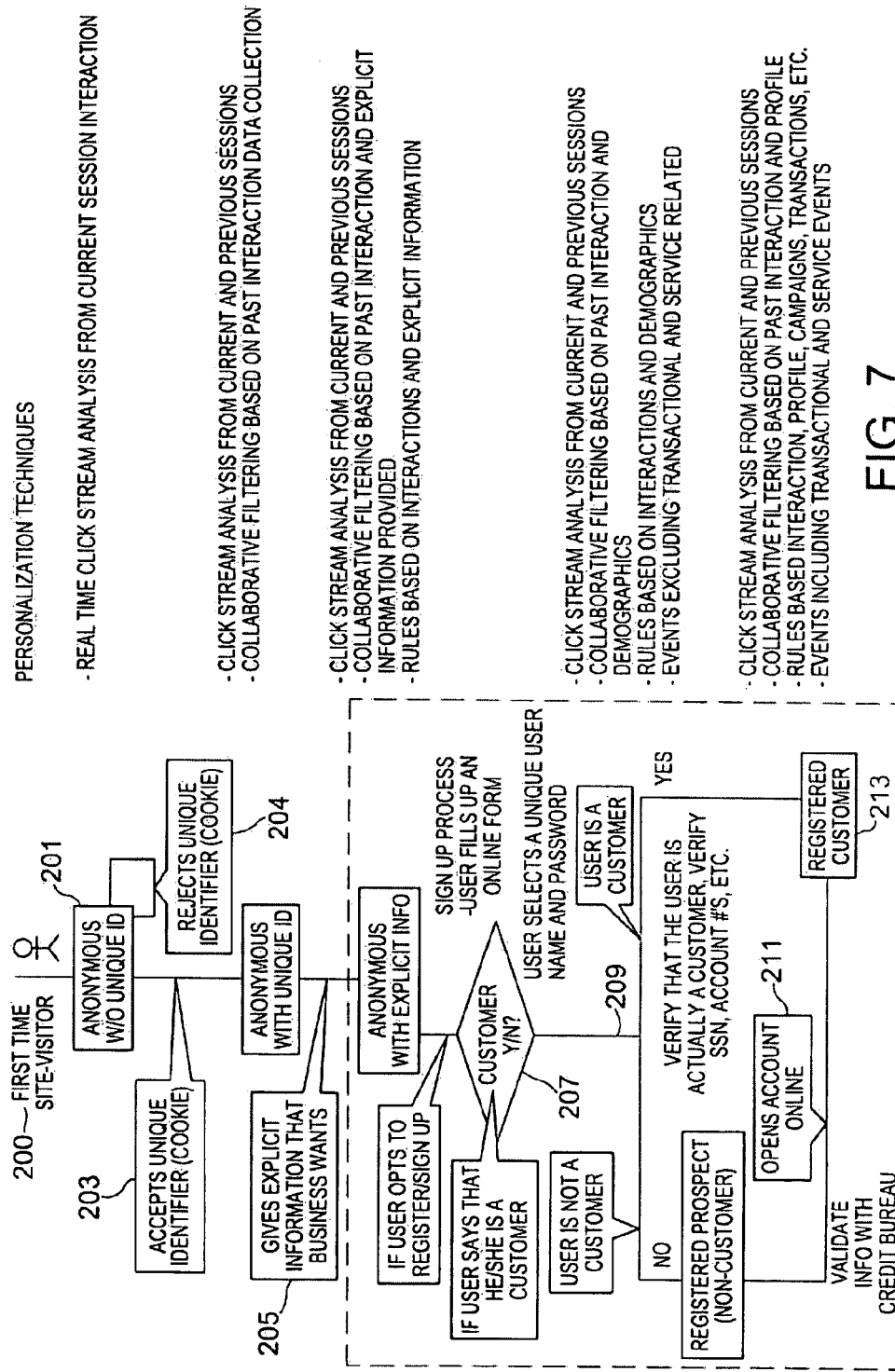

FIGS. 5, 5A and 6 show what the user sees and the data captured by the profile manager global profile repository 118A (FIGS. 2 and 3) and interaction data 118B which is captured by the system using the techniques of personalization. The profile manager 118 creates a PIF entry (profile file) for the user, updates the PIF entry with explicit information and preferences, interests, etc., addresses, E-mail addresses, phone numbers, demographic information like age, income group or any other information that the information/service/product provider needs and asks for any other demographic information, some of which can be confidential such as social security number, relationships, etc. The steps in the dashed box, including steps 207-213, show some of the authentication techniques.

FIG. 7 again shows the initial interaction between a site visitor and the system, this time showing the personalization techniques used by the system at the various stages of the interaction. These include real time click stream analysis from current session interaction, click stream analysis from previous sessions and collaborative filtering, to be described in greater detail below, based on past interaction and data collection. Further, personalization is based on other rules based on interactions and explicit/implicit information. In addition, other rules stored in the system in addition to those based on interactions and demographics, e.g., include those based upon campaign transactions, the customer's profile and events including transactions and service related events.

Figure 8:
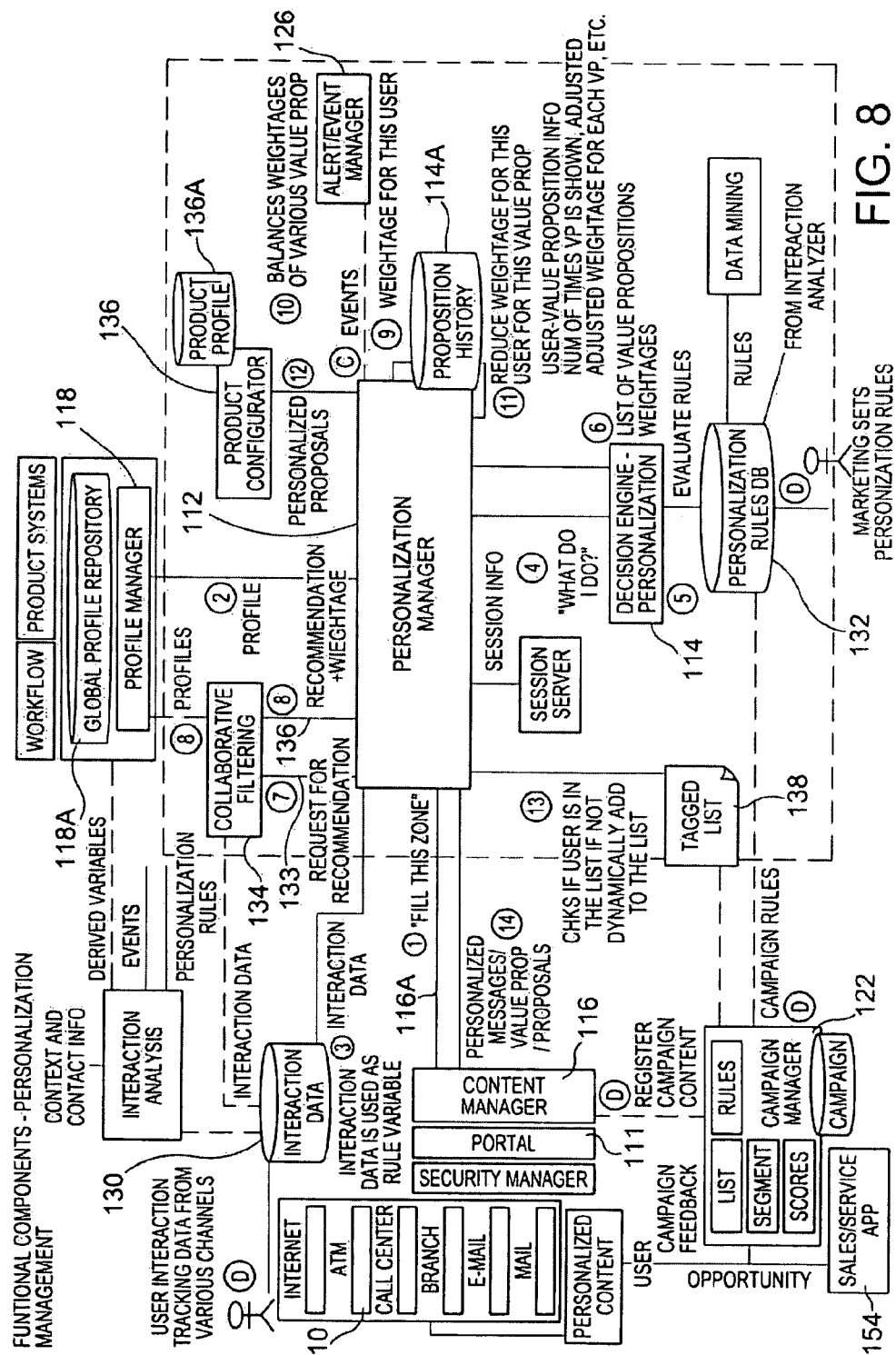
FIGS. 8 and 8A are detailed block diagrams of the interaction of the personalization manager component shown in FIGS. 2 and 3, this flow demonstrating the role and functionality of this component.
Figure 8A:
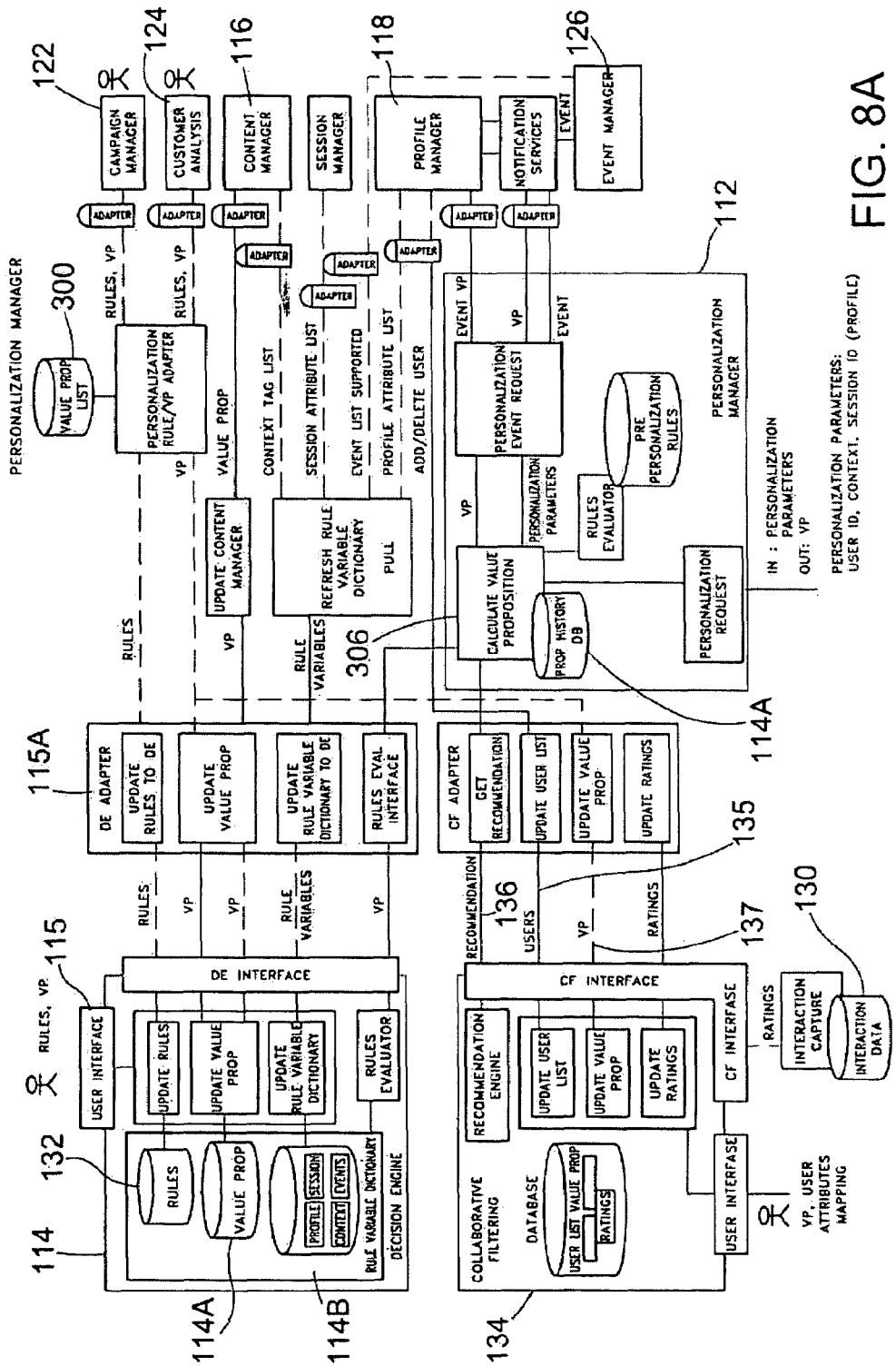

FIGS. 8 and 8A show a more detailed block diagram of the functional components of the system which are used in personalization. FIG. 8A shows greater detail than FIG. 8. As described previously, personalization can be achieved through various techniques including collaborative filtering, interaction based on rules, including campaign rules and events. A value proposition database 114A, included in the decision engine 114, has user specific value proposition information like the number of times the value proposition is shown, adjusted weightage for each value proposition, time stamps, the channel upon which the user is interacting with the system. etc.

With reference to FIGS. 8 and 8A, the content manager 116 passes a request 116A from the user to the personalization manager 112 for a recommendation of a value proposition to be presented to the user. As part of this request, a user's profile is passed from the profile manager 118 to the personalization manager 112. The user's interaction data from the interaction data storage 130 is also passed as an input to the personalization manager 1112. These personalization manager queries are passed to the decision engine 114 for application of rules. The decision engine 114 evaluates the various rules stored in the rules data base 132. The decision engine 114 then passes back all the value propositions that the user should be targeted with based on a decision process executed by the decision engine 114. Along with each value proposition, the decision engine 114 passes a weightage and rule type. The personalization manager 112 will calculate the best value proposition to present to the customer, as described below.

The personalization manager 112 then sends a request 133 to collaborative filtering engine 134 for a recommendation. The filtering engine 134 uses various data elements including profile from profile manager 118, interaction, etc. from the interaction data storage 130 to perform a "like mind" analysis. The collaborative filtering engine 134 returns a recommendation 136, i.e., a value proposition.

The personalization manager 112 gets the weightage for this user for all the value propositions obtained from the various sources including the decision engine 114, collaborative filtering 134, etc.

The personalization manager 112 then balances weightages of various value propositions and selects the best one for the particular user.

The personalization manager 112 updates, along with other flags, the value proposition data base 114A to adjust the weightage for this particular user and this particular value proposition and records the use of the proposition in the campaign manager. The personalization manager 112 then contacts the product configurator 136 which builds a personalized proposal depending on the user's profile and product/service (value proposition) profile 136A.

If the value proposition has been selected by the decision engine 114 and the rule type satisfied for the value proposition is a campaign, then the decision engine 114 checks the corresponding campaign, category for this user. The selected value proposition need not be a campaign it could be an alert, etc. If the user is present, the decision engine 114 updates flags in a tagged list 138. If the user is not present then it adds the user to the list 138. The personalization manager 112 then sends the best value proposition to the content manager 116 which provides the selected value proposition to the user and assembles the content thereof via the portal 111 and selected channel 120.

Figure 9:
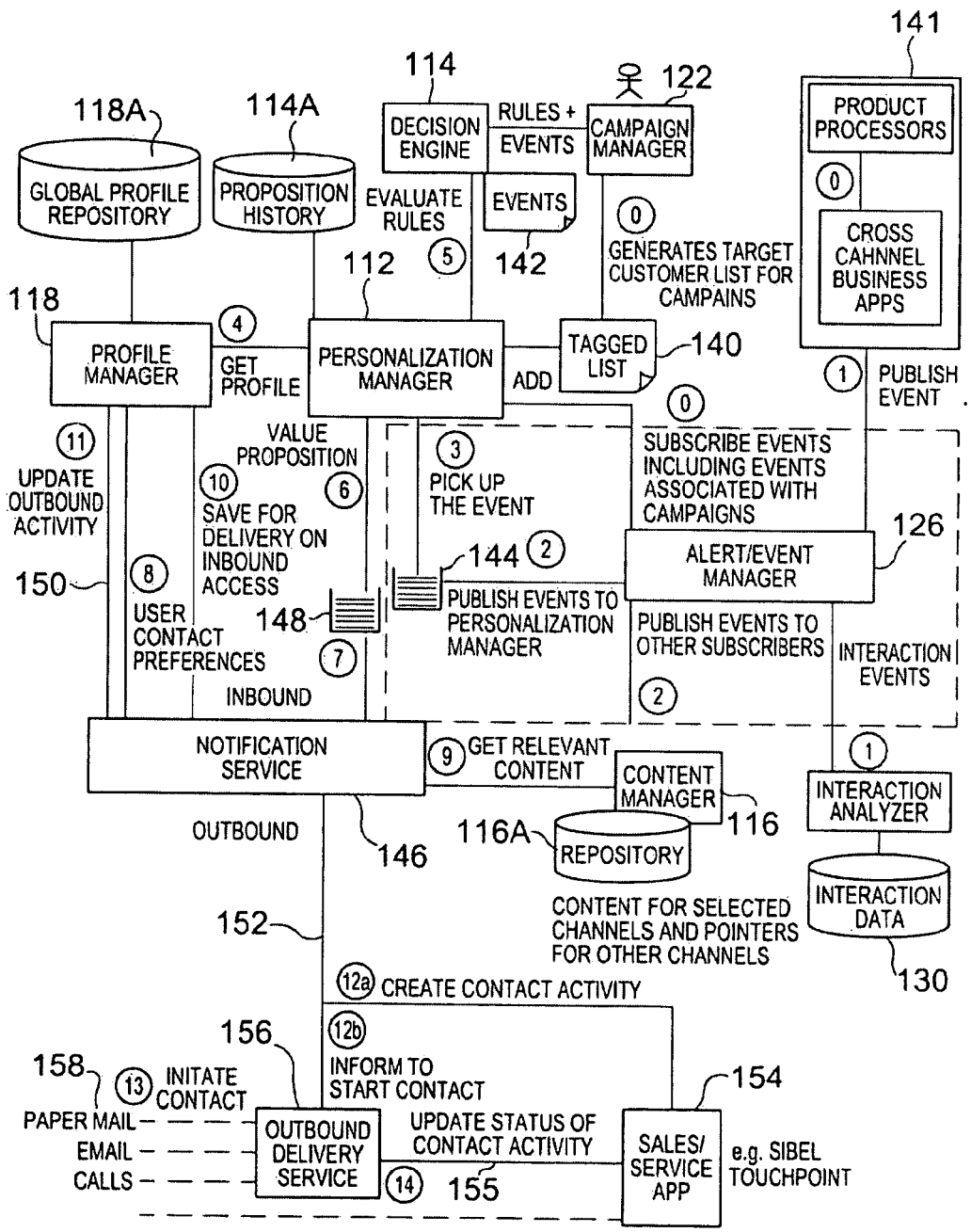
FIGS. 9 and 9A are block diagrams showing the interaction of components of the invention based upon triggering by an event to achieve personalization.
Figure 9A:
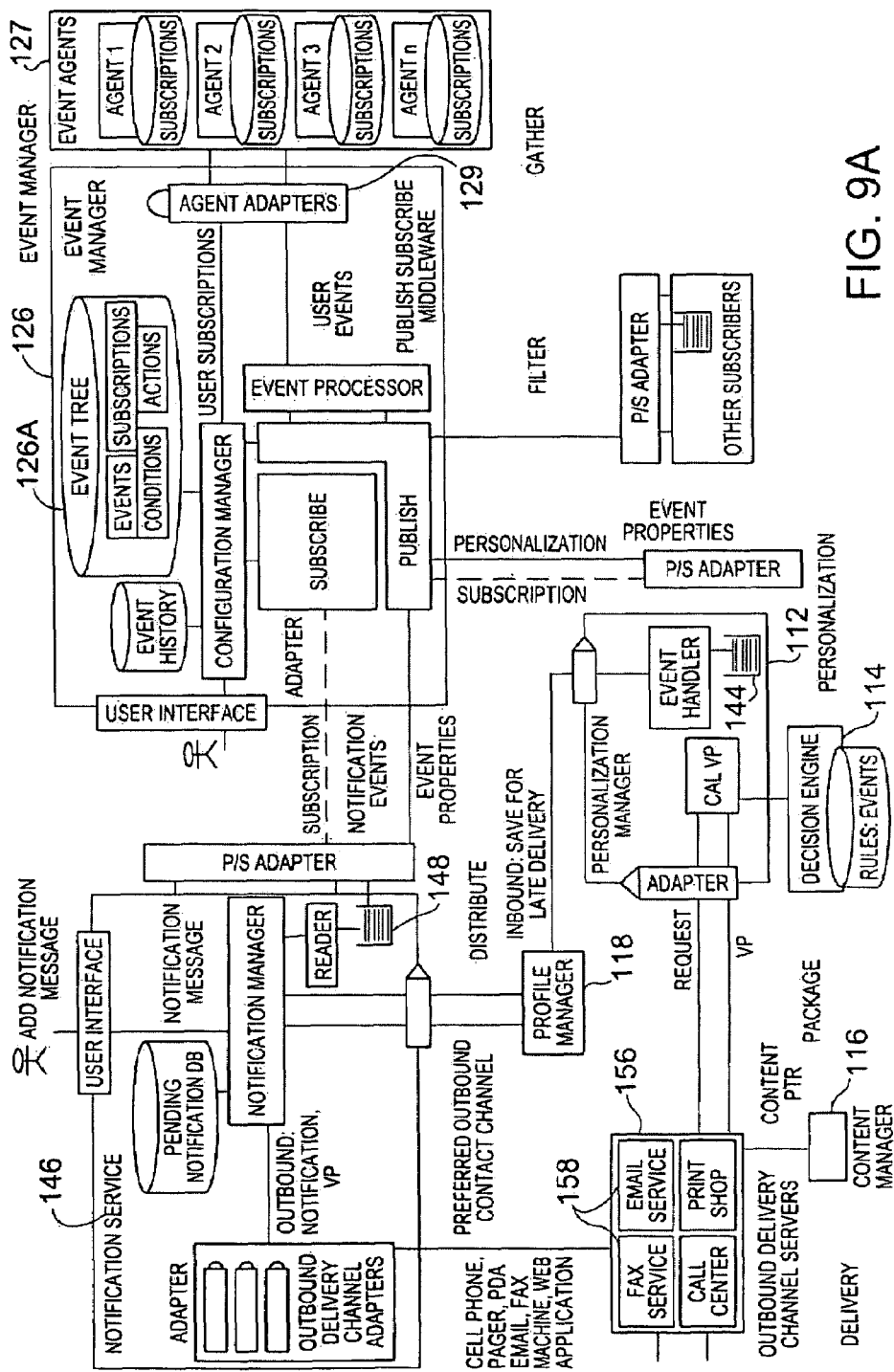

FIGS. 9 and 9A shows functional components for event triggered personalization, FIG. 9A in greater detail. An event is a stimulus which triggers an action. The action could be executed by the information/service/product provider or by a business application. A business application can publish events whenever any business action is executed. External feeds can trigger events. The following types of events can be distinguished although they are not exhaustive: life events, market/bank information, feed events, customer relationship events, sales related events, advice related events, service related events, transactional/work flow events, user session events, profile related events, etc.

The campaign manager 122 generates target customer lists 140. Events 142 can be associated with campaigns. These events are subscribed with the alert/event manager 126. The campaign manager also sets frequency rates for the campaign against the tagged list as well as tracks cost data regarding the campaign.

The flow for event triggered personalization is as follows. Business applications 141 trigger various types of events. All generated events are associated with a particular user (customer/prospect). The alert/event manager 126 subscribes to all events for all customers, implicit or explicitly by the user.

The alert/event manager 126 publishes the event to all the subscribers of the event. One of the subscribers is the personalization manager 112. The alert/event manager 126 passes this event to the personalization manager 112 through a queue 144. The personalization manager 112 picks up this event from the queue 144. The personalization manager 112 checks the user associated with the event. The personalization manager 112 retrieves the user's profile from the profile manager 118. The content manager paints and pushes the event information to the subscriber.

Using the decision engine 114, the personalization manager 112 selects the most appropriate value proposition at that time for the event and for the particular user. The notification service 146 gets the user's preferences from the profile manager 118 to find out the user's preferred outbound contact channel, which may be one of the inbound channels 10 or different outbound channels. The notification service 146 gets the content (or pointer to content depending on the channel) for the value proposition to be delivered on the selected channel from the content manager 116. If the value proposition is to be delivered on an inbound access channel 10, then the value proposition is saved in the user's profile in the profile manager 118. This can be used for later delivery on the channel, for example, the Internet, when the user comes back to the provider. The notification service 146 updates the profile manager 118 with the outbound activity 150. For outbound delivery 152, the notification service 146 creates a contact/activity list in sales/service application 154 and informs the outbound delivery service 156 to deliver. The outbound delivery service 156 actually initiates the contact across various channels 158, for example E-mail, paper mail, faxes, etc. The sales/service application 154 is updated by the outbound delivery service 156 with the status of the outbound contact/delivery.

Figure 10:
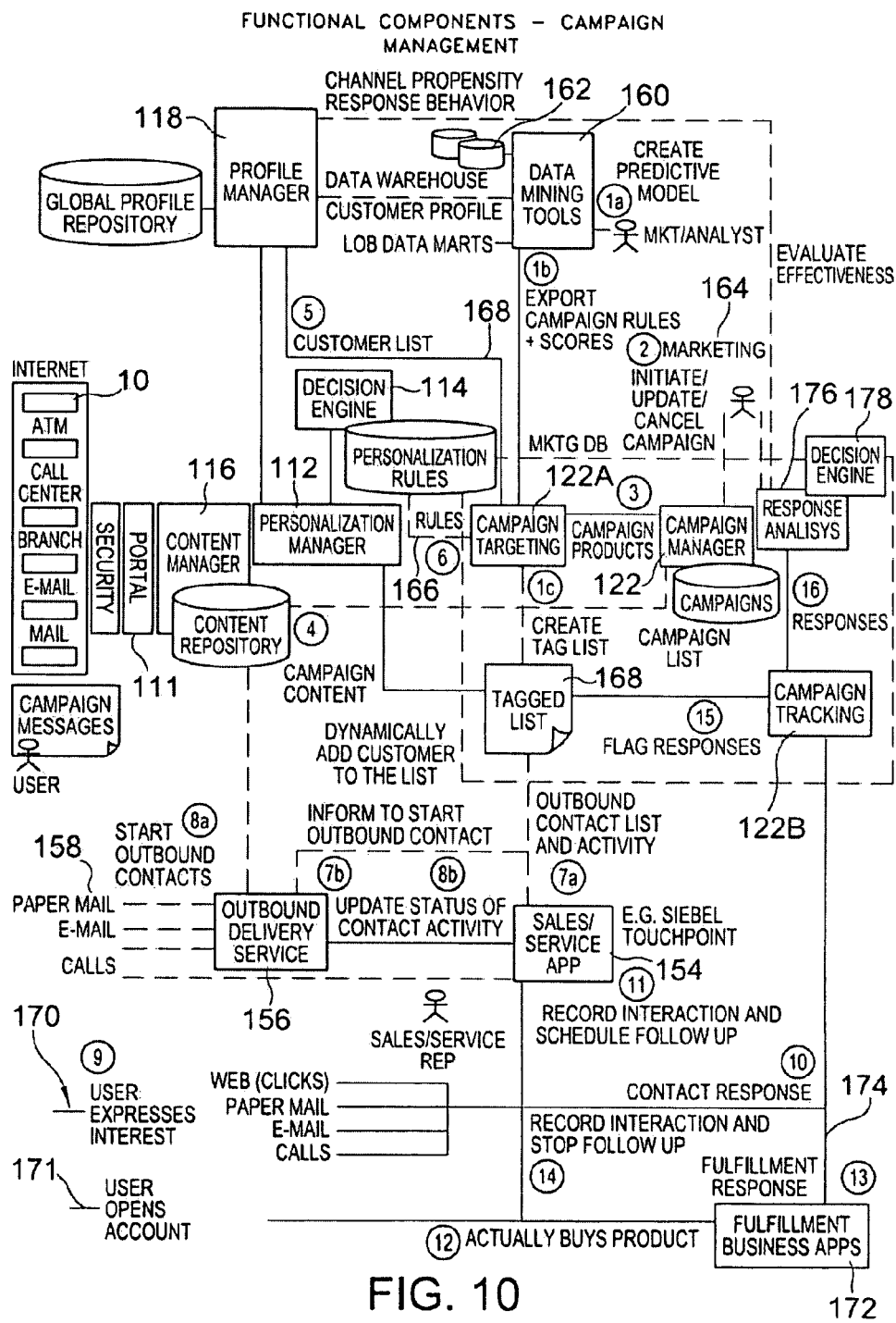
FIGS. 10 and 10A show the interaction of functional components of the personalization architecture and technical objects used during campaign management.
Figure 10A:
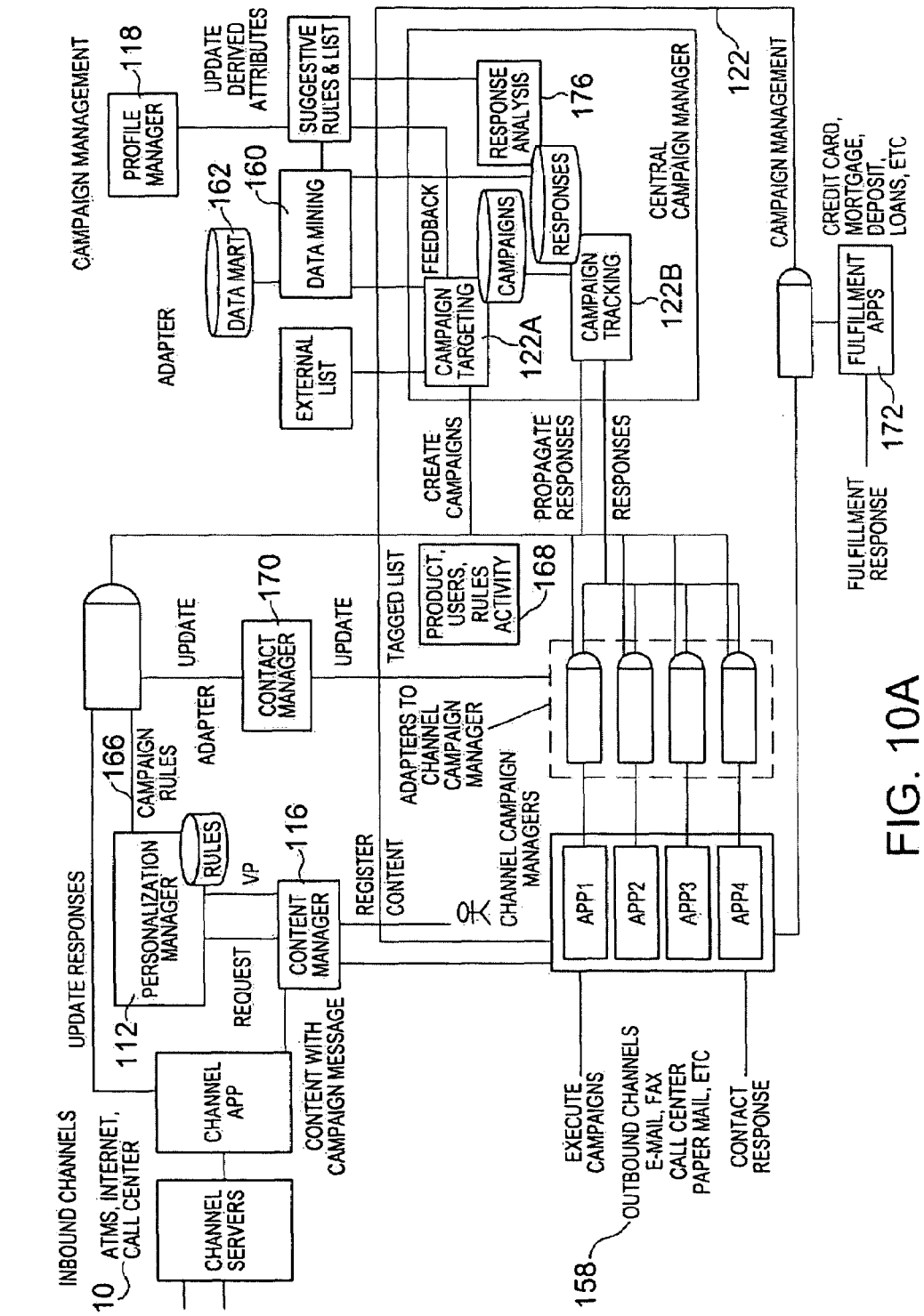

FIGS. 10 and 10A show functional components related to campaign management. FIG. 10A shows greater technical detail.

Customer analysis (data mining) 160 utilizes the data warehouse 162 to produce campaign rules including propensity rating (scores) for a particular customer. Marketing personnel 164 initiate campaigns for product promotion. The campaign manager 122 accepts the product/value proposition input and registers campaign related content components with the content manager 116.

Campaign targeting 122A validates the generated campaign rules 166. It generates a tagged customer list 168 with the help of the profile manager 118. Campaign targeting 122A exports the campaign rules 166 to the personalization manager 112 and, in particular, to the decision engine 114. Campaign targeting 122A also creates a contact and activity list 168 in sales applications 154 and informs the outbound delivery service 156 to start the outbound contact activity across various channels, for example, E-mail, paper mail, telephone calls, faxes, etc. The campaign is then executed on the chosen outbound channels 158.

Customer/prospect responses 170 can be of two types. One is that the customer seeks more information about the campaign or product. The contact response information is captured in real time and passed to campaign tracking 122B. The response is also fed to the sales/service application 154. This assists in scheduling further follow-up or can also be for no further outbound contact in the case of a negative response. Other kinds of response includes that the user/prospect actually buys the targeted product, e.g., by opening an account 171. This is entered in the fulfilment application 172. The fulfilment application 172 generates a fulfilment response 174 keyed to campaign tracking 122B. Fulfilment response is also recorded in sales and service applications 154 to follow-up.

Campaign tracking 122B updates the tagged targeted list 168 with the response. This helps the personalization manager 112 to take appropriate next action on inbound contact with the user from channels 10. Response analysis 176 analyzes the campaign response using a decision engine 178. This information is passed back to marketing 164 which can evaluate campaign effectiveness. The feedback is looped back into the existing campaigns and/or used for future campaigns.

When a customer/prospect interacts on an inbound channel, the personalization manager 112 evaluates the campaign rules 166. If the customer satisfies the campaign rules and is not present on the list, then the user is added to the list with relevant information. The personalization manager 112 then provides the campaign value proposition to the user via the content manager/assembler 116 and portal 111. If the user is already on the list then the personalization manager 112 also offers the value proposition to the user.

Figure 11:
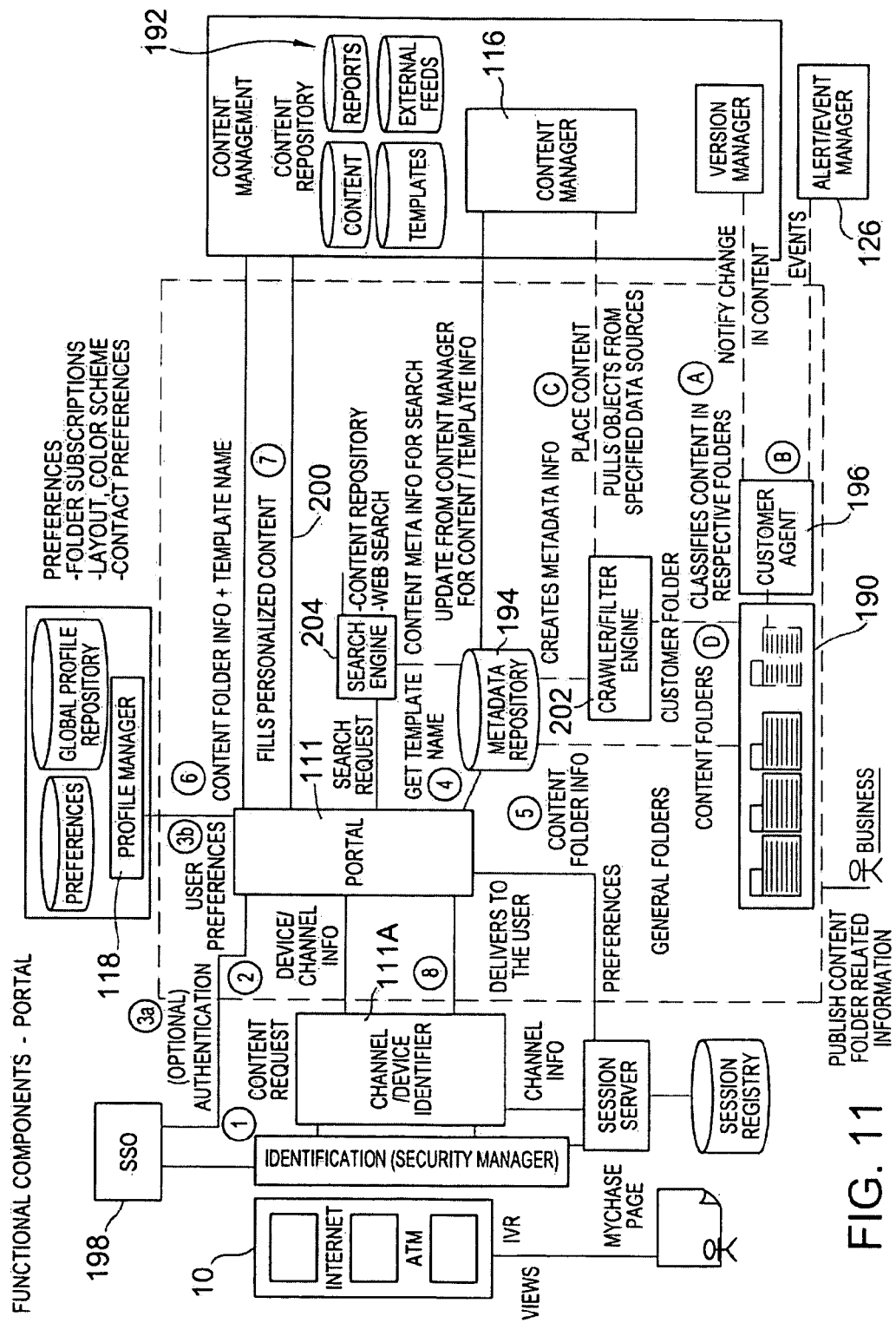
FIG. 11 shows functional components of the personalization architecture portal interface with the user.

FIG. 11 shows the functional components of the portal and content assembler.

The content folders 190 are a set of business defined logical groups of one or more topics. The business provider can publish information to the folders and users can subscribe to them. Preferably, the folders do not have the actual content. Instead, they have pointers to content. The actual content preferably resides in the content repository 192 connected to content manager 116. A folder 190 may have restrictions for access as specified by the business provider.

A metadata repository 194 is also provided. The metadata repository contains pointers to the content elements, user preferences, content folders, ACLs, etc. This is information on how to reach a particular item of information.

The customer agents 196 work in the background to automatically search customer defined events and to save the content in the customer specific content folder 190. They also pre-fetch commonly requested information in the same folder.

The flow of content between user and portal 111 and the personalization manager 112 is as follows:

After the user is identified or authenticated by SSO 198, the request is passed to a channel access manager 111A. The channel access manager 111A identifies the user's channel and device that the user is using and passes the user identification and device/channel characteristics to the portal 111. The portal 111 fetches the user's preferences from the profile manager 118. Based on the user's channel characteristics and preferences, the portal 111 selects an appropriate template from the metadata repository 194. Based on the user's subscription stored in the profile, the portal gets the general content folder information and customer specific folder information from the metadata repository 194 based on pointers in folders 190. The content folder information is passed to the content manager 116.

The content manager 116 then returns a filled personalized content 200. This content, personalized to the customer, is delivered to the user through a delivery engine, not shown.

Offline, a crawler filter engine 202 automatically scans specified data sources for objects of interest. It classifies them and places the actual content in the content manager 116 and appropriate information in a content folder 190. This occurs off line. Additionally, also offline, a search engine 204 enables users to find objects using key words like names, descriptions, content types and filters. The user could be alert or notified upon return of new content.

Figure 12:
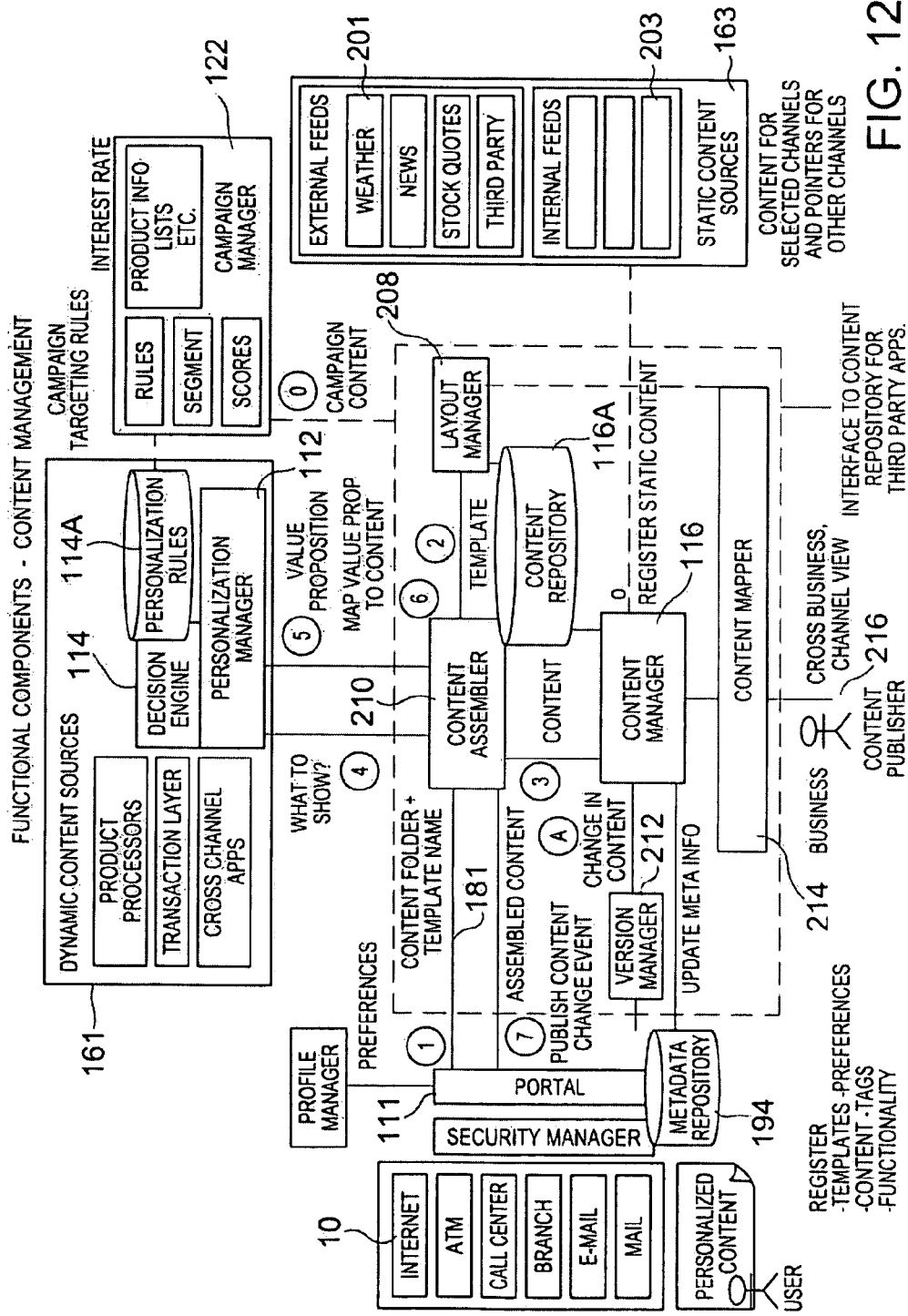
FIGS. 12, 12A and 12B show functional components and technical objects of the personalization architecture relating to content management.
Figure 12A:
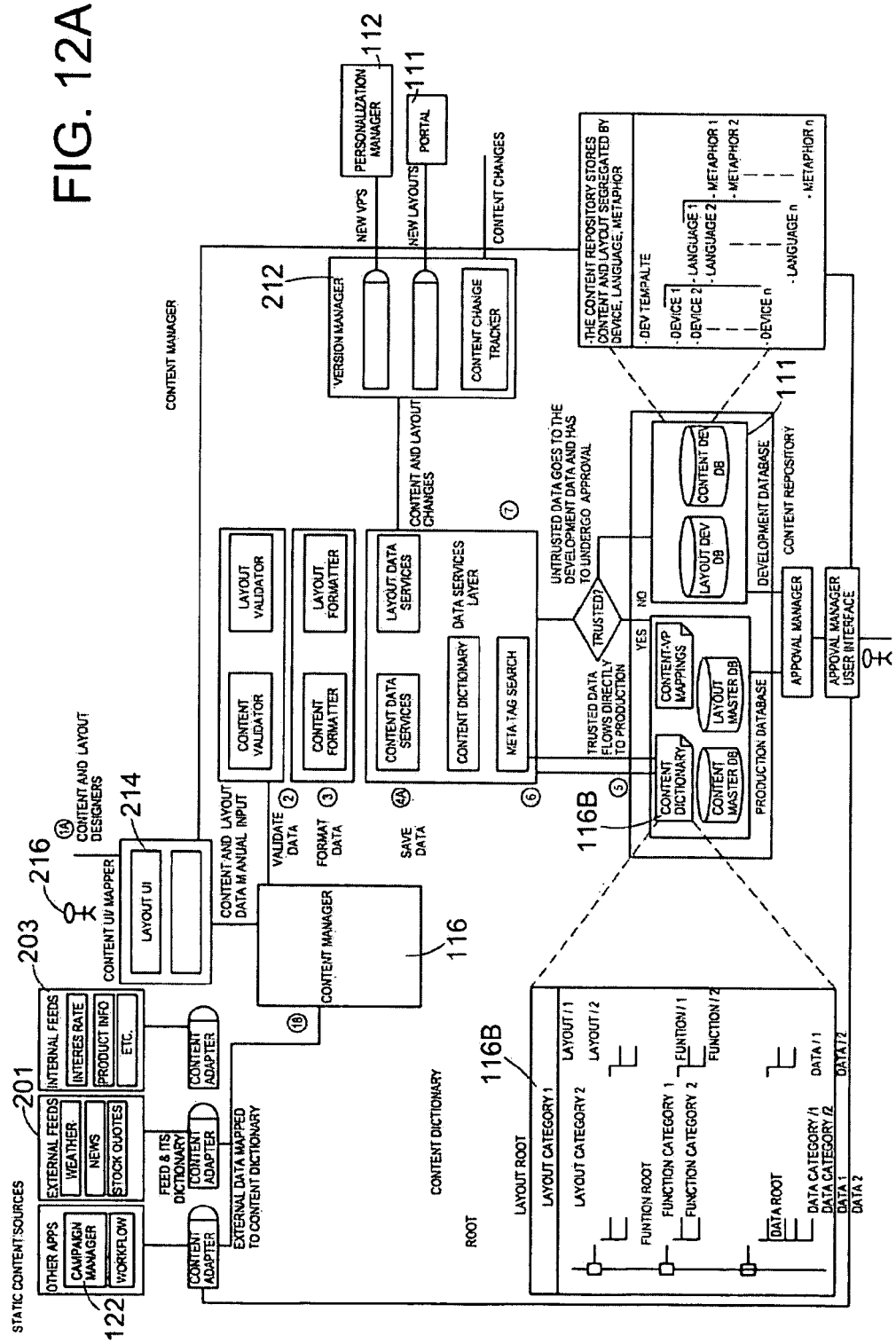

FIGS. 12 and 12A show functional components for content management.

Content can come from two types of content sources, either a dynamic content source 161 or a static content source 163. Dynamic content is provided by applications like the personalization manager 112. Campaign related content is also selected dynamically and registered with the content server. Static content 163 can come from external feeds 201, for example, weather, news, stock quotes or internal feeds 203, for example product knowledge.

The content repository 116A contains content elements, pieces of content, for example, HTML files, images, applets, for selected channels, for example, the internet, web, ATM, etc. and pointers to content for other channels, for example, IVR, Siebel, etc. It also has information to map a value proposition to the content manager 116.

The flow for content management is as follows:

The portal 111 passes (181) a template name to the content manager 116. It uses the layout manager 208 to retrieve the actual template from the content repository 116A. The template is passed to the content assembler 210 which evaluates the template. It is divided into zones and each zone has a pointer to the source of the content. One or more zones can point to the personalization manager 112. The content assembler queries the personalization manager 112 for a value proposition. The personalization manager 112, using various techniques including the decision engine 114 and personalization rules database 114A, returns the best value proposition to the content assembler 210. The content assembler 210 maps the value proposition to the actual content element which is selected from the content repository 116A. The content assembler 210 returns the assembled content to the portal 111 for passage to the user.

Off line, a version manager 212 publishes a notification event whenever a specified content element is changed. The portal 111 subscribes to this event and puts it in the user's content folder 190. The version manager 212 also notifies the owner of the content for version update. The content mapper 214 offers the content designer 216 a multi-dimensional view of the content element. It shows all other content that refers to this content, all channels that it is used in, all rules that point to this content, etc. The content mapper 214 provides content integrity and cross references. All content is added/removed/administered through the content mapper 214.

Figure 13:
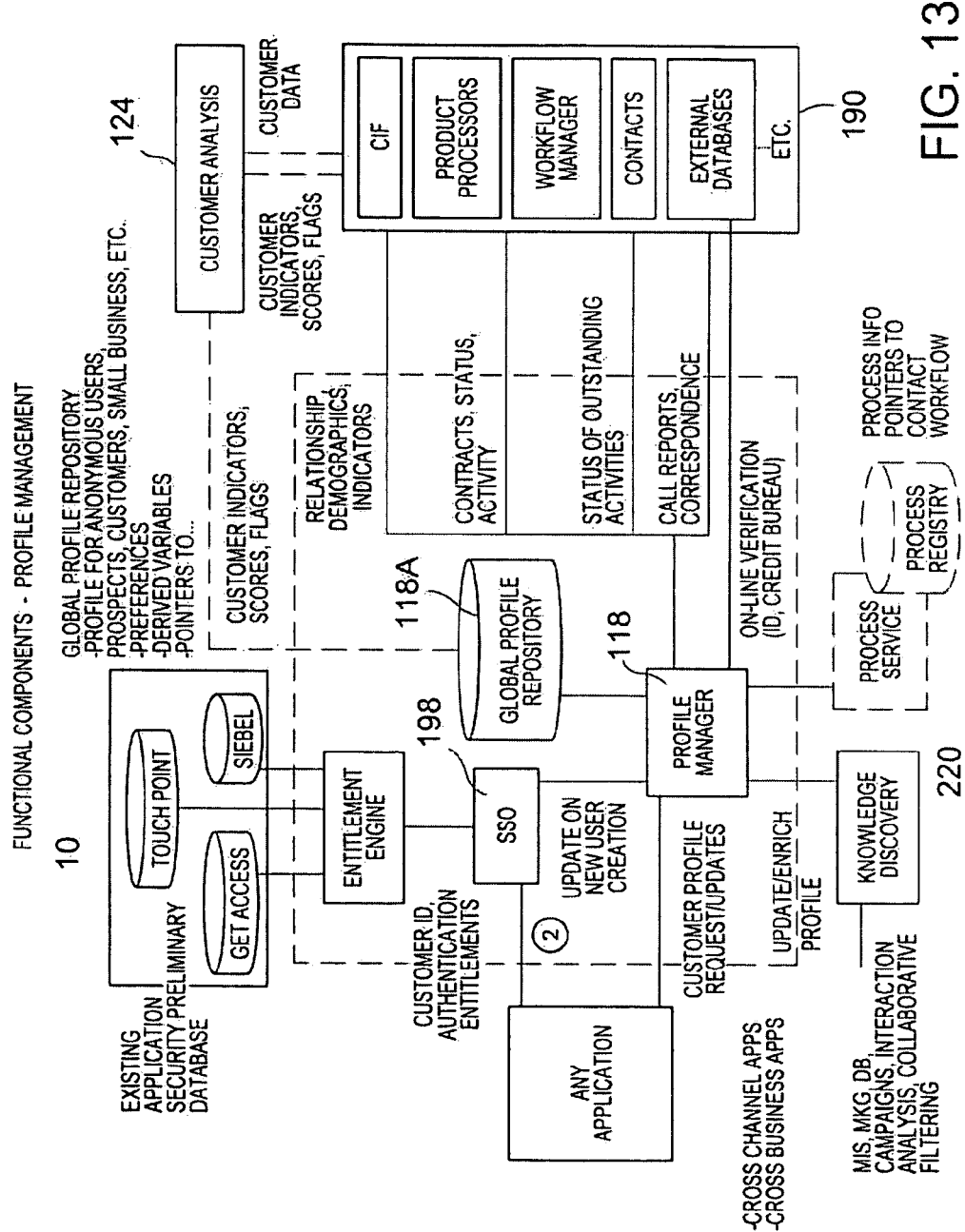
FIGS. 13 and 13A show functional components and technical objects of the personalization architecture relating to customer profile management.
Figure 13A:
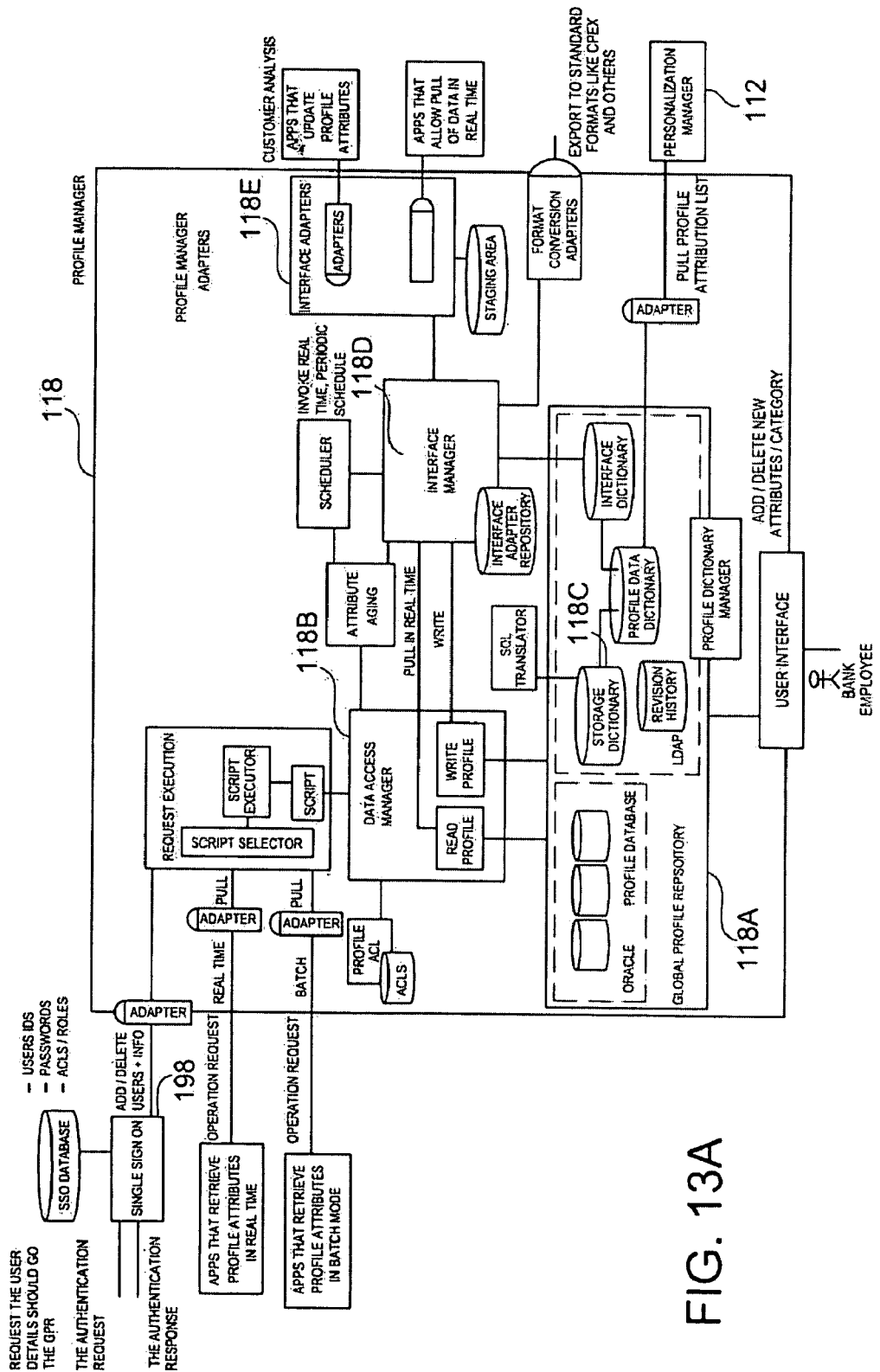

FIGS. 13 and 13A show functional components for profile management. The profile manager 118 is a broker which offers pointers/linkages to systems containing customer/prospect data. It contains supplementary information such as customer preferences. It assembles customer profiles using the global profile repository 118A. The profile manager is preferably integrated with single sign on (SSO) 198. It holds psychographic, demographic and other data elements related to a profile.

Online identity and credit verification of new customers can be by known means of online inquiry or external systems such as Bureauflex. The profile manager 118 is the gateway to any customer related information. It provides an aggregated view of the customer information. It provides a common API/messaging interface to all other business/provider applications. The profile manager 118 shields everyone from collecting distributed data across the business/provider.

Over a period of time, as the available customer data increases, the profile can be enriched to update the psychographic variables through knowledge discovery 220. The profile is enriched with the knowledge derived from various applications like the campaign manager 122, MIS reporting 160, collaborative filtering 134 and other interactions collectively indicated at 190.

FIG. 13A shows the architecture of the profile manager 118 in greater detail.

Figure 14:
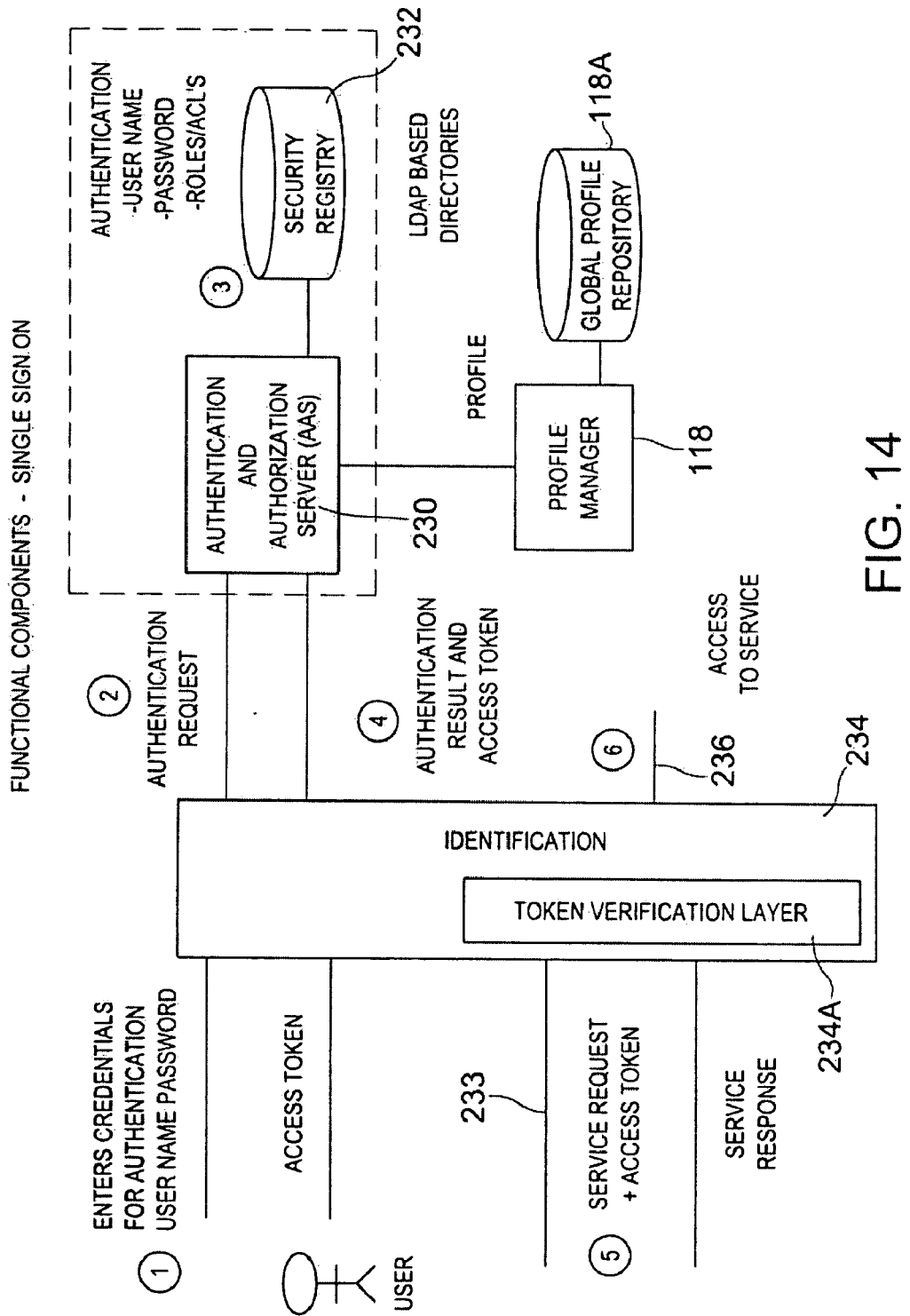
FIG. 14 shows functional components of the personalization architecture relating to user authentication.

FIG. 14 shows functional components relating to single sign on (SSO).

All user authentication requests are passed to an authentication and authorization server (AAS) 230. The AAS 230 maintains/manages a security registry 232 which holds all customer/non-customer security identifiers like user name, password, access control layer, roles, etc. Whenever a new user signs up, the AAS 230 creates the same user scheme for a customer and/or prospect in the profile manager 118.

The flow for single sign on is as follow:

On any user request, the identification component 234 identifies if the user's request needs authentication. If the request is for a non-restricted item, the request is passed forward and the profile manager retrieves the user's preferences and alerts the content manager to assemble the view to the portal 111. If the request is for restricted items, it is passed through the AAS 230. The AAS 230 authenticates the user by verifying the user's identification/password. This is done by checking against the security registry 232. If the user is authenticated, along with the authentication status, the AAS 230 returns a navigation menu to the identification component 234 which holds the customer's entitlements for application servers and services. This is built by the AAS 230 based on rules. The AAS 230 also returns encrypted authentication tokens to the identification component. The token holds the user name, roles and validity information. The authentication token is stored in the customer's session. The token is passed with every subsequent service request to the corresponding web/application server, as shown at 233.

The access token is passed with every subsequent service request from the user. The token verification layer 234A verifies the tokens. If the token passes the verification process, the service request is passed forward, as shown at 236. Otherwise, it is blocked and the user is denied access to the service.

Figure 15:
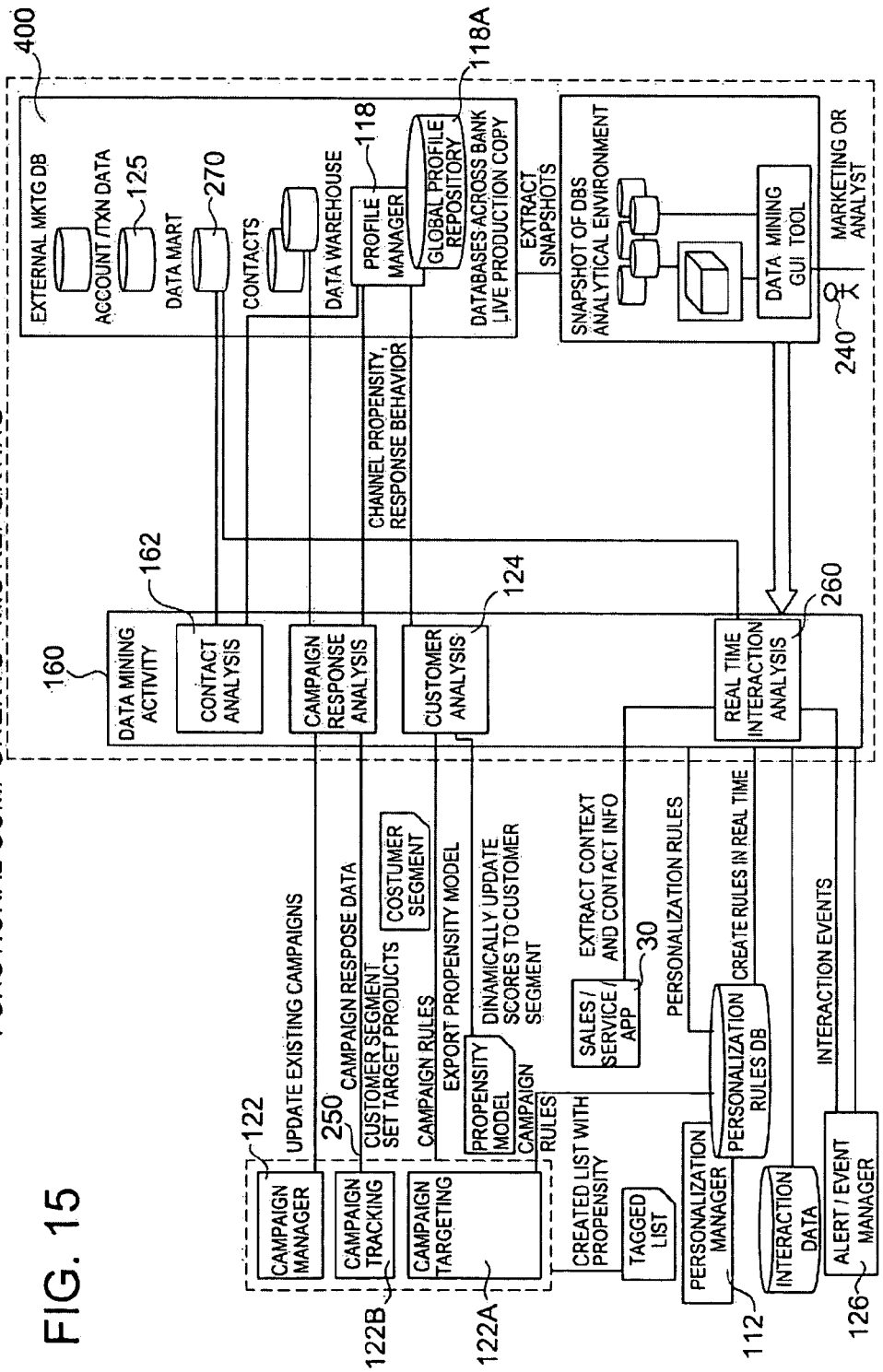
FIGS. 15 and 15A show functional components and technical objects of the personalization architecture relating to management information system reporting and customer analysis.
Figure 15A:
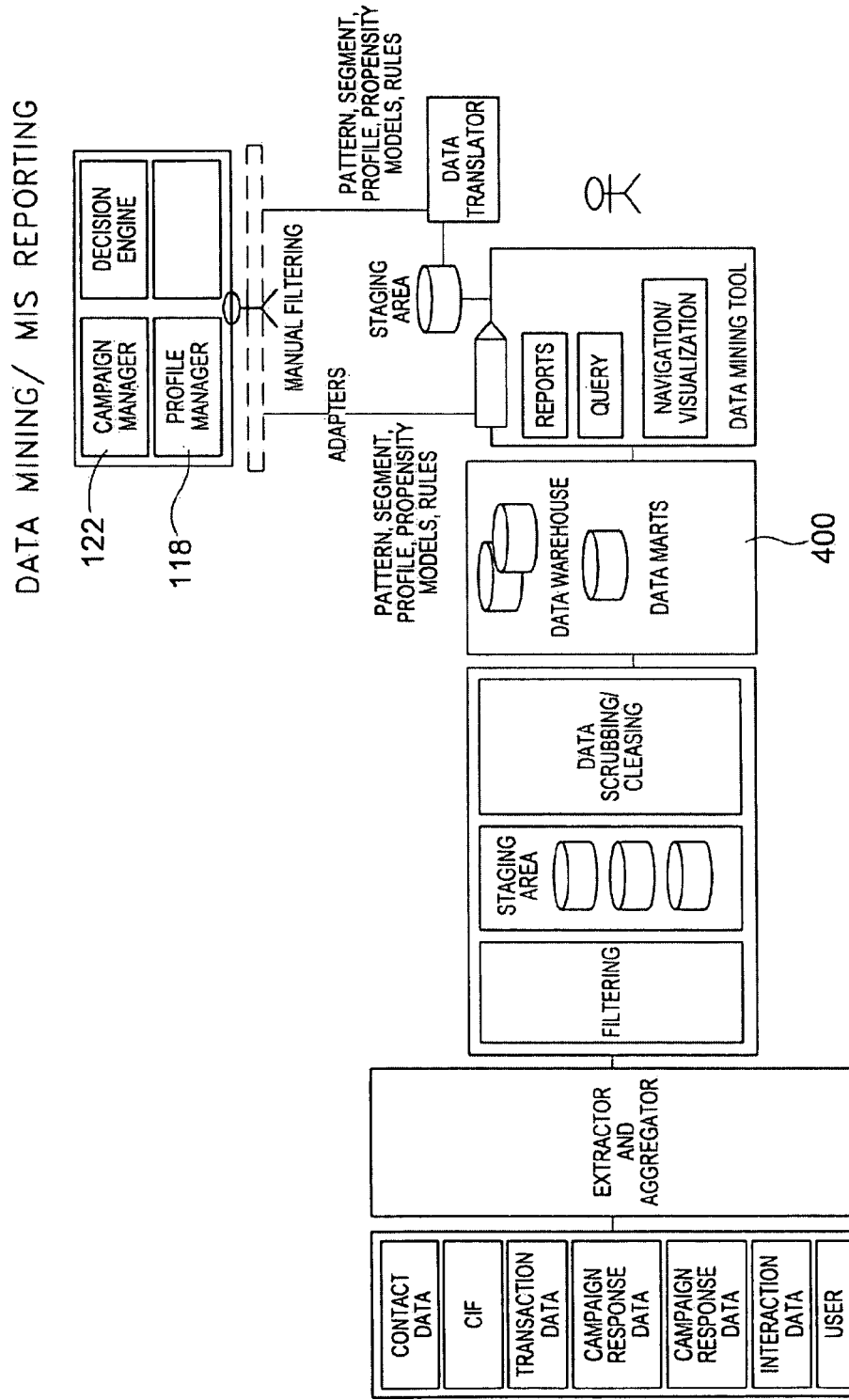

FIGS. 15 and 15A shows functional components related to MIS (management information systems) reporting.

Data mining is the extraction analysis of data for purposes of discovering knowledge for large data bases. Data mining tools automate prediction of trends/behaviors and discovery of previously unknown patterns, allowing businesses to make proactive, knowledge driven decisions and new business logic/rules. Data mining can be performed on any user related data available across the information/product/service provider. Analysts 240 can extract a snap shot of the data bases 400 and run data mining tools in a separate analytical environment.

An analyst 240 using the customer/prospect data in the profile manager 118 and data mining tools can create a predictive propensity model. From this model, the data mining tools generate a customer segment, rules and propensity score for a customer segment. This can operate also in reverse. Marketing can define a customer segment by a rule in the campaign management application and data mining can generate a propensity model and score the customer segment in the campaign management application.

Campaign response data 250 can be fed to data mining applications 160 to analyze the response data. The response can be used to modify existing campaigns or for future campaigns. It can also derive certain customer/prospect attributes which can be updated through the profile manager 118.

User interaction, for example, click stream on the internet, can be captured and analyzed in real time, as shown at 260. Analysis can derive context out of the interaction. The context can generate interaction events, which can be sent to the alert/event manager 126. These events can be further sent to the personalization manager 112 for selecting the best value proposition. Interaction analysis 260 can generate new personalization rules based in real time for the personalization rules database 132. Interaction analysis 260 can also derive customer behavior patterns, channel usage, navigation patterns etc.

A contact manager 120 (see FIG. 2) captures contracts made with the system and stores these in contacts data base 270. Contacts can be analyzed using contacts data mining tools 162 to understand the user contact patterns, channel usage and purpose etc. This can be fed back into the user's profile. Contacts can be used for purposes of audit, security, service analysis, and business processes.

As described, the present invention provides the ability for cross-channel applications to offer services, functions, and capabilities across all channels and allows the user of the system to have the ability to create a customer centric experience as well as allowing data knowledge to be gathered, analyzed and used. A cross-channel application can be used on any channel, for example, internet, ATM, phone lines, call centers, etc. Cross-channel applications can be layered on top of industry standard technology infrastructure, for example, message oriented middleware, component based architecture, industry standard platforms such as EJB, JMS, XML, MQ series, LDAP, BEA Weblogic, Oracle DB, Java Script scripting Engine, Sun Solaris and Unix, without limitation. Cross-channel application services are available to the different types of applications including the profile manager 118, the personalization manager 112, the event manager 126, the product configurator 136 and other cross-channel applications. All cross-channel applications can be made available on both external messaging and an internal EJB bus. To ensure performance and scalability, cross-channel applications are preferably hosted on an EJB application server environment. To meet today's fast changing business environment, a scripting capability can be provided to link the business service components to shorten the cycle time for rolling out new/updated business services.

Figure 16:
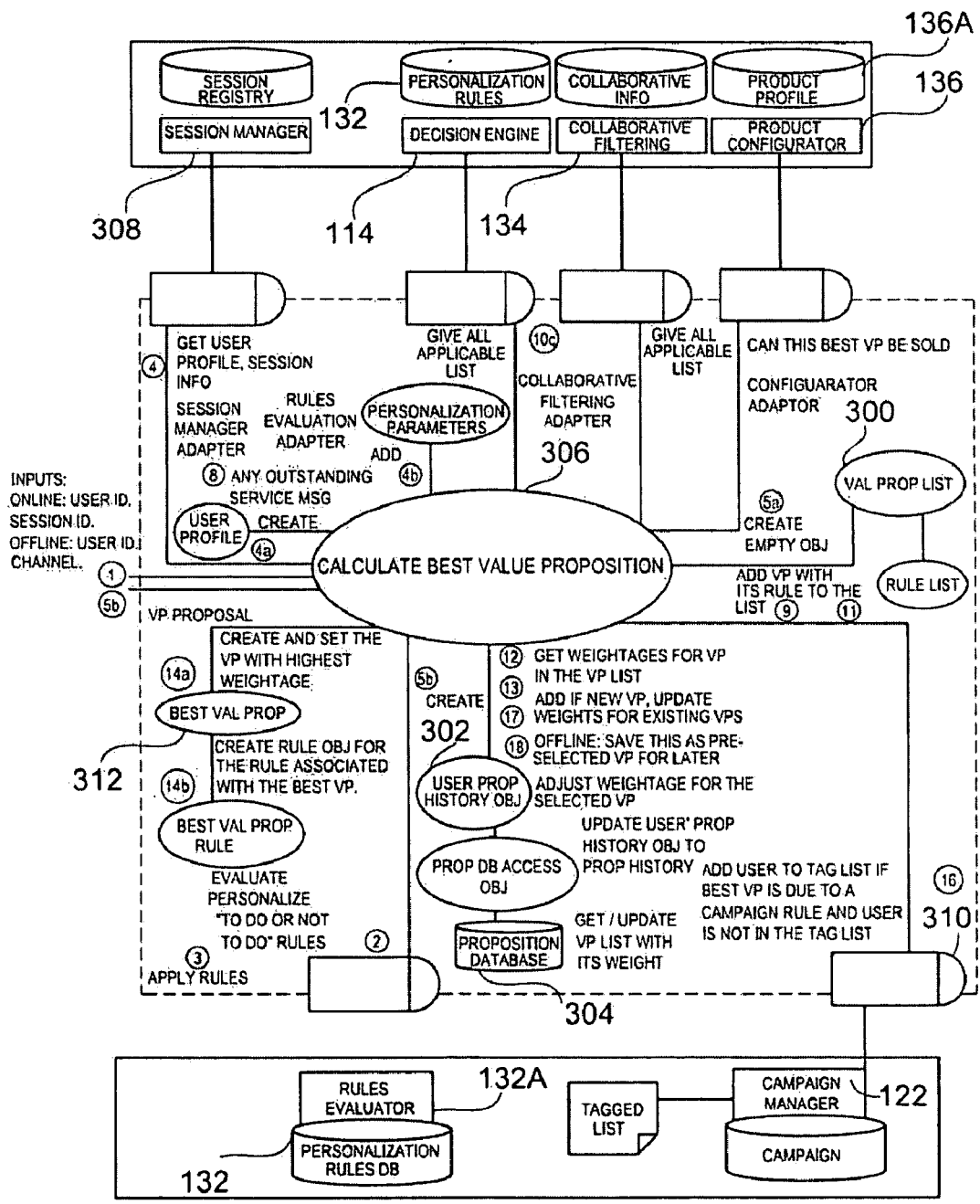
FIG. 16 shows how a decision on a value proposition to be offered to a customer online is made by the system of the invention.

FIG. 16 shows in greater detail how the personalization manager 112 calculates the best value proposition or offer to a customer on line.

A rules value proposition list 300 contains a list of all best value propositions with rules for each value proposition. This list is specific to a user. For a value proposition which is waiting for a delivery to a customer, the value proposition list is provided by the decision engine 114 and collaborative filtering 134. These are saved in the value proposition list 300.

A user proposition history object 302 contains the value proposition and the weight of each for a user. This information is extracted from a proposition history data base 304. The weight of the value proposition being offered to the user is reduced further. On session termination, all this updated information is written back to the proposition history data base 304.

The proposition history access object 302 accesses the proposition history data base 304 to get/set a value proposition weight list for a user. In case of an off line request, the found best value proposition is stored in the proposition history database 304.

The value proposition object 302 contains the best proposal that can be offered to a user. It contains the value proposition related rule and proposal information.

The flow for calculating the best value proposition is as follows:

First, a request to find a best value proposition for a user is passed to the calculate best value proposition component 306. The calculate best value proposition component 306 determines whether it is necessary to present any personalized proposals to the user. This is based upon the personalization rules data base 132 and rules evaluator 132A that is part of decision engine 114. The rules are applied on the request for the particular user and session. A user profile is then obtained from the session manager 308. This is used as one of the inputs to derive value propositions. The user profile and session information are kept ready for use by the decision engine 114. The decision engine 114 is used to extract a value proposition list for the user. The calculate best value proposition component 306 also finds out whether any value propositions are waiting for delivery for this particular user. Any such value propositions are stored in the user proposition history object 302.

The decision engine 114 and collaborative filtering engine 134 are then queried to derive value proposition lists best suited for this user. The decision engine 114 applies rules on the user and session information it has and derives a value proposition list 300. Collaborative filtering 134 gives a list of value proposition/recommendations after performing a "like mind analysis". The returned lists are stored in the value proposition list 300.

The calculate best value proposition component 306 balances weightages of various value propositions and selects the best one for this user from the complete list present in the rules/value proposition list 300. The product configurator 136 keeps a mapping of all value propositions to proposals that can be offered to a particular user. It applies rules and finds out whether the proposal for a value proposition can be offered to the user. In case a value proposition cannot be offered to a user, the calculate best value proposition component 306 checks for the next best value proposition.

If the chosen value proposition is a result of a campaign, then the user is added to the tag list 310 if the user is not already present. If the campaign has expired, then the value proposition/rules are deleted and the next value proposition is checked with the product configurator 136. The best found proposal is stored with its rules in the best value proposition object 312. In case of an on line request, this proposal is returned to the user. If the request or user is off line, it is saved in the proposition history data base 304 for later on line use.

Personalization is a process by which the system of the invention identifies the best value proposition to be delivered to the user. This can be done in several ways. One way is to calculate the best value proposition in real time on every click and show it to the user. Another way is to calculate/save a list of value propositions off line, even when the user has not come to the service provider. This means that the service provider does not use the user's context and current session click stream as inputs. Further, this would not use the contact history that the user may have generated after the off line activity. Another way is to calculate/save a list of value propositions at the start of the session and at every click select one and show it to the user. Again, this method does not use the user context and current session click stream.

Another option is to categorize rules as session static and session dynamic and at the start of the session or when off line calculate and save a list of value propositions. Later, when on line, on every click, the session dynamic rules can be evaluated. The downside to this method is that new session static rules that are added during the session cannot be utilized. The choice between the various options is a compromise between being effective and performance.

With reference again to FIG. 8A, the decision engine 114 manages a rule variable dictionary 114B. The rule variable dictionary 114B is a data structure which holds information of all the attributes shown. It is a list of variables and associated information that can be used for personalization. The rule variable dictionary includes the following categories of variables: profile attributes from the profile manager, session attributes from the session manager, context variables from the content manager and events from the event manager. See FIG. 8A.

The rule variable dictionary 114B is updated to match the corresponding data model or attribute list of each of the above systems. In order to set up the dictionary, all the attributes are entered in the dictionary. The attributes can be entered either manually in the dictionary via a user interface 115 or can be updated by a programming interface 115A.

The personalization manager 112 preferably has a graphical user interface (GUI) through which marketing personnel can refresh the dictionary whenever required. This could also be done in real time whereby each of these systems could update the personalization manager 112.

The collaborative filtering engine 134 returns recommendations based upon user input and is fed with the user list 135 along with psychographic data and the value proposition list 137. The collaborative filtering engine 134 uses ratings which customers provide with respect to value propositions, i.e., information/products/services offered. Based upon these ratings it can then determine what types of information/services/products should be offered to the user. Another way to do this is over a period of time. After customers use the system, ratings can be defined based upon the user's preferences. Based upon these preferences, the collaborative filtering engine 134 can make recommendations as to other information/products/services.

Turning again to the content manager (FIG. 12A), the content manager 116 maintains a content dictionary 116B which is maintained in the content repository 116A. The content repository 116A is organized in the form of a tree structure termed a "content dictionary" 116B. The content dictionary is a hierarchical tree of content category by which content elements are classified. The tree structure allows content to be grouped into categories and further subcategories. The root of the content dictionary tree is called "NCS root".

The first three branches from the root are as follows: The first branch is the layout category subtree. All template/layouts are stored under this node. They are further classified as branches. Each such branch represents a unique template which can be directly mapped to user preferences. They are not further branched. The second branch is the function category subtree. All functions are stored under this node. They are further classified as branches and sub-branches. Each has a unique function which can be directly mapped to user preferences.

The third branch is the data category subtree. All data categories are stored under this node. They are further classified as branches and sub-branches. Each sub-branch represents a unique data category which can be directly mapped to user preferences.

Figure 12B:
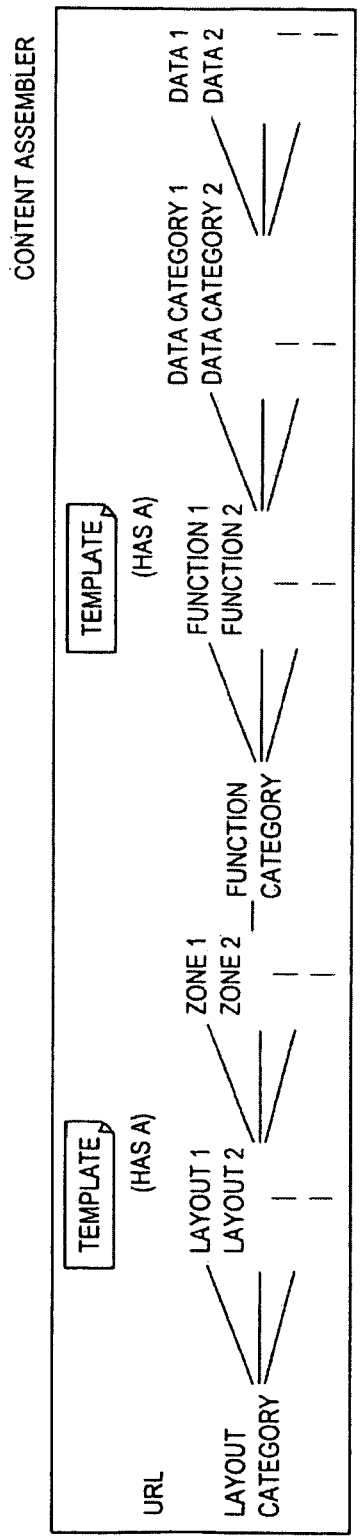

Still referring to FIG. 12A, and with further reference to FIG. 12B, the content assembler flow is as follows: Every incoming request (URL) directly refers to a layout category. Each layout category may have a number of layouts. The correct layout is chosen based on the user's layout preference and on the device and channel the user is utilizing. Each layout has an associated template which defines visual characteristics. This template defines multiple zones and a function category for each zone. Each function category has one or more functions. Appropriate functions are chosen based on the user's interests amongst all the functions in this function category stored as preferences with the profile manager. A function contains a template and one or more data categories. This function template provides a consistent way (for a device/channel) in which the function is displayed irrespective of the data category. A data category is a node in the content dictionary 116B. Each function may have one or more data categories and also have one or more data elements. For all static contents, appropriate data elements are chosen based on which data element the user is interested in amongst all the data elements in this data category. This interest is stored as a preference with the profile manager 118. For all dynamic content a separate adapter component can be written. This component can communicate with an application and get back the data elements.

Content is gathered for personalization as follows: Personalization is a function category specified in a zone. A content selector contacts the personalization manager to resolve this function category to a value proposition for the customer. The value proposition is mapped to a function for the channel and device. The function has a template and one or more data categories and is processed accordingly as other functions.

Transactions, for example, a balance summary, transfers, etc. are a function by themselves. Transactions contains a template and a data category. The transaction data category has a corresponding object component to be called and provides the data for the transaction result to be displayed.

The product configuration is the data category with a corresponding object component to be called and provides the product configuration information for a given product for the customer in session. For example, if a home equity loan is being proposed, the product configuration will provide terms and conditions for this customer based on the customer's relationship and credit information.

Events, pending for delivery during inbound customer interaction, belong to a specialized event data category. The corresponding object component will be called to retrieve the pending events for customer display.

Turning again to the event manager (FIG. 9A), all events are stored in an event tree 126A. The tree structure allows event types to be grouped into categories and further subcategories. Each branch in the tree represents a subcategory of the event it branches from. The event tree is built dynamically. When a new event type is added to the environment, it is added to the tree so that it is available for subscription. Access to the event tree can be either to read or to write. A write access adds an event type to the tree. The tree is read to publish the event to all the subscribers.

The event properties describe the event itself and further relevant information associated with the event. Event agents 127 generate events that are in the event tree. For the first event, a new event type is created in the tree. This is done by calling one of the operations offered by the event manager. Every time, including the first time, the event agents 127 generate the event and pass event properties to the event manager 126. Subscribers subscribe to events that are in the event tree. For the first time they subscribe to the event and every time including the first time they receive the event along with event properties.

Event subscriptions are customer applications which subscribe to events or event categories. They can specify the following subscription information: Extra conditions that must be satisfied before the event is forwarded to them. The event manager 126 will evaluate these conditions before forwarding the event. They also specify what action to perform when the event occurs. They also indicate the expiration of the subscription. The conditions are evaluated and the action is performed by the event manager 126. The client application specifies this in a form of class name. These classes are installed on the event manager.

Event agents 127 are applications that generate events. They monitor required data sources. Event agents have user preferences about the event that they can generate. A new event that is sent to the event manager 126 will have a user ID associated with it. Event agents communicate with the event manager 126 through standard adapters 129 which support, for example, XML over MQ series, EJB interfaces, etc. Custom adapters can be built to support additional interfaces, for example, news agents, stock agents, transaction agents.

The LDAP comprises the following: A profile data dictionary, interface dictionary and a storage dictionary. The profile data dictionary is a dictionary to hold the data model of the profile. The data model is stored as a hierarchical tree. It has a list of profile attributes. The tree is stored in an LDAP directory. The profile dictionary manager automatically updates the interface and storage dictionary whenever the profile data dictionary is modified.

The interface dictionary holds information about the source of the attributes. It describes how each attribute needs to be fetched and which adapter to use. It describes that the attributes have to be fetched in real time or in batch mode, the frequency, age, etc.

The storage dictionary holds an internal storage and retrieval related information like the table name, field name, name, etc. this dictionary describes each and every attribute and attribute category. These attributes are saved in multiple tables across data bases. This dictionary is stored in an LDAP directory.

The profile data base physically holds the actual profile attributes. Storage of the attributes is optimized for retrieval/update of the attributes and may not be the same as the profile data model.

Returning to FIG. 13A, the data access manager 118B manages all read and write access to the customer profile database. It aggregates scattered attributes from internal and external storage systems. For reading the profile, it reads the storage dictionary 118C. This gives information about how to fetch the profile. Various methods can be used to fetch the profile, for example, obtaining it in real time from the source system through the interface manager 118D, reading from the local database, etc. For each method, there is additional information which aids in fetching the profile. In writing the profile, the data access manager 118B uses the storage dictionary 118C. The dictionary tells where to write the profile attributes.

The interface manager 118D manages interfacing to business systems. Anything coming in or going out occurs through the interface manager 118D. It uses suitable interface adapters 118E to gather/exchange profile information.

The global profile repository 118A is built by pushing and pulling. Certain attributes are fetched in real time when required. Certain attributes are downloaded periodically, for example, in batch mode. Applications can update the profile attributes in real time. Certain attributes can be written in batch mode. The profile attributes can have ACLs for read/write access. Any read/write access to the global profile repository 118A preferably should be through an authorization component. The data access manager 118B can impose these restrictions.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A method for an enterprise having multiple business units to communicate with a user over multiple channels, the method comprising:
   interfacing with the user over at least one of the multiple channels;
   storing potential offers available to the user in an offer database, the potential offers being supplied from the multiple business units;
   storing a user profile with respect to the user in a user profile database; and
   determining which of the potential offers to present to the user and which of the multiple channels over which to make the presentation based on the stored user profile and the stored potential offers.

2. The method of claim 1, further comprising forming the user profile based on current interactions with the user.

3. The method of claim 1, further comprising storing information in a knowledge management repository in a plurality of selected ones of the following:
- a contact database, workflow database, security database, audit database, customer preference database, customer entitlement database, content database, application database, data warehouse, data mart, customer profile database, segmentation database, business rules database, campaign rules database and product/service/information database;
- wherein said determining is further based on said information.

4. The method of claim 2, further comprising forming the user profile based on current and past interactions with the user.

5. The method of claim 4, wherein the user profile includes information about the user including at least one of information/product/service preference, address/telephone number, demographic information, user interests and other user identification information.

6. The method of claim 1, further comprising storing rules in a rules database, wherein said determining is further based on said rules.

7. The method of claim 6, further comprising storing in a campaign data base a plurality of potential campaigns to present to the user and making a determination of at least one potential campaign to present to the user.

8. The method of claim 7, further comprising providing user profile information from the user profile database to personalize the potential offers to present to the user.

9. The method of claim 8, further comprising managing contact with a customer service representative of a provider of the potential offers to present to the user.

10. The method of claim 8, further comprising assembling information personalized to the user using selected display objects stored in a content data base for display on a user's communication device.

11. The method of claim 10, further comprising providing information for updating the user profile regarding user related events.

12. The method of claim 10, further comprising providing a content repository for at least one of content elements including images for selected channels and pointers to content for selected channels; retrieving a content element from the content repository, evaluating the content element and assembling the content element for presentation to the user.

13. The method of claim 12, further comprising providing a pointer in the content element and responding to the pointer by presenting a selected value proposition to provide in assembled content to the user.

14. The method of claim 13, further comprising mapping a selected value proposition to a content element in the content repository and returning the content element to the user via at least one channel.

15. The method of claim 7, further comprising using a data mining tool to analyze data relating to the user to produce campaign rules including a propensity rating for the user to be interested in a campaign.

16. The method of claim 15, further comprising generating a target list of users to whom campaigns should be targeted based on the campaign rules and propensity rating.

17. The method of claim 16, further comprising tracking a response to a selected campaign and updating the target list based on the response.

18. The method of claim 17, further comprising analyzing the response to a selected campaign and presenting the analysis to marketing personnel.

19. The method of claim 6, further comprising storing value propositions comprising information/product/services to provide to the user together with weights for each value proposition for the particular user.

20. The method of claim 19, further comprising maintaining the value proposition in a value proposition data base along with the weights for each value proposition.

21. The method of claim 20, further comprising determining at least one of the value propositions to present to the user.

22. The method of claim 21, further comprising building a personalized proposal based on a selected value proposition and the user profile.

23. The method of claim 19, further comprising providing a selected value proposition to the user over a preferred outbound communication channel of the user.

24. The method of claim 1, wherein the multiple channels are selected from the group consisting of the Internet, Extranet, ATM/kiosk, direct mail, e-mail, fax, call center and branch office.

25. The method of claim 24, wherein the user interfaces using a display terminal and wherein the at least one channel comprises the Internet.

26. The method of claim 1, wherein potential offers to present to the user comprise one of a plurality of financial products.

27. The method of claim 26, wherein the financial products comprises at least one of a small business financial product, credit card account, automobile financing, home financing, savings account, investment, insurance, education finance and unsecured loan.

28. The method of claim 1, further comprising authenticating the user.

29. The method of claim 1, wherein the step of determining comprises personalizing information presented to the user by at least one of click stream analysis from the user communication device, collaborative filtering based on past and/or present interaction, explicit information provided by one of the user and another input device, rules based on interaction with the user and explicit information and events including transactional and service related events.

30. The method of claim 29, wherein the step of determining comprises using collaborative filtering based on a like mind analysis.

31. The method of claim 1, wherein the step of determining further comprises personalizing information provided to the user based on at least one event, the at least one event including a user life event, market/bank information feed event, customer relationship event, sales related event, advice related event, service related event, transactional/workflow event, user interaction event and user profile related event.

* * * * *